US010823920B2

(12) United States Patent
Balle et al.

(10) Patent No.: US 10,823,920 B2
(45) Date of Patent: Nov. 3, 2020

(54) TECHNOLOGIES FOR ASSIGNING WORKLOADS TO BALANCE MULTIPLE RESOURCE ALLOCATION OBJECTIVES

(71) Applicant: Intel Corporation, Santa Clara, CA (US)

(72) Inventors: Susanne M. Balle, Hudson, NH (US); Rahul Khanna, Portland, OR (US); Nishi Ahuja, University Place, WA (US); Mrittika Ganguli, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 15/395,443

(22) Filed: Dec. 30, 2016

(65) Prior Publication Data

US 2018/0027055 A1    Jan. 25, 2018

Related U.S. Application Data

(60) Provisional application No. 62/365,969, filed on Jul. 22, 2016, provisional application No. 62/376,859, (Continued)

(51) Int. Cl.
*G06F 1/20* (2006.01)
*G06F 3/06* (2006.01)
(Continued)

(52) U.S. Cl.
CPC ......... *G02B 6/3897* (2013.01); *G02B 6/3882* (2013.01); *G02B 6/3893* (2013.01); (Continued)

(58) Field of Classification Search
CPC ...... G06F 1/206; G06F 9/5094; G06F 1/3203; G06F 1/329; G06F 1/3206; G06F 9/5088; H04L 67/34; H04L 41/0813; H04L 41/147
See application file for complete search history.

(56) References Cited

U.S. PATENT DOCUMENTS 7,127,625 B2 * 10/2006 Farkas .................... G06F 1/206
713/320
7,644,051 B1 * 1/2010 Moore ................. G05B 13/027
706/21
(Continued)

OTHER PUBLICATIONS

International search report for PCT application No. PCT/US2017/038731, dated Sep. 27, 2017 (3 pages).
(Continued)

*Primary Examiner* — David R. Lazaro
(74) *Attorney, Agent, or Firm* — Barnes & Thornburg LLP

(57) ABSTRACT

Technologies for allocating resources of managed nodes to workloads to balance multiple resource allocation objectives include an orchestrator server to receive resource allocation objective data indicative of multiple resource allocation objectives to be satisfied. The orchestrator server is additionally to determine an initial assignment of a set of workloads among the managed nodes and receive telemetry data from the managed nodes. The orchestrator server is further to determine, as a function of the telemetry data and the resource allocation objective data, an adjustment to the assignment of the workloads to increase an achievement of at least one of the resource allocation objectives without decreasing an achievement of another of the resource allocation objectives, and apply the adjustments to the assign-
(Continued)

ments of the workloads among the managed nodes as the workloads are performed. Other embodiments are also described and claimed.

28 Claims, 17 Drawing Sheets

Related U.S. Application Data filed on Aug. 18, 2016, provisional application No. 62/427,268, filed on Nov. 29, 2016.

(51) Int. Cl.

| | |
|---|---|
| *G06F 9/30* | (2018.01) |
| *G06F 9/50* | (2006.01) |
| *G06F 12/14* | (2006.01) |
| *G06F 13/16* | (2006.01) |
| *G02B 6/38* | (2006.01) |
| *G02B 6/42* | (2006.01) |
| *G02B 6/44* | (2006.01) |
| *G06F 16/901* | (2019.01) |
| *H04B 10/25* | (2013.01) |
| *G11C 5/02* | (2006.01) |
| *G11C 14/00* | (2006.01) |
| *H03M 7/40* | (2006.01) |
| *H04L 12/24* | (2006.01) |
| *H04L 12/26* | (2006.01) |
| *H04Q 11/00* | (2006.01) |
| *H04W 4/80* | (2018.01) |
| *G06F 1/18* | (2006.01) |
| *G06F 8/65* | (2018.01) |
| *G06F 9/38* | (2018.01) |
| *G06F 9/4401* | (2018.01) |
| *G06F 9/54* | (2006.01) |
| *G06F 12/109* | (2016.01) |
| *G06F 13/40* | (2006.01) |
| *G06Q 10/08* | (2012.01) |
| *G06Q 10/00* | (2012.01) |
| *G06Q 50/04* | (2012.01) |
| *G08C 17/02* | (2006.01) |
| *G11C 7/10* | (2006.01) |
| *G11C 11/56* | (2006.01) |
| *H03M 7/30* | (2006.01) |
| *H04L 12/851* | (2013.01) |
| *H04L 12/811* | (2013.01) |
| *H04L 12/931* | (2013.01) |
| *H04L 29/08* | (2006.01) |
| *H04L 29/06* | (2006.01) |
| *H05K 5/02* | (2006.01) |
| *H05K 7/14* | (2006.01) |
| *H04L 12/911* | (2013.01) |
| *B25J 15/00* | (2006.01) |
| *B65G 1/04* | (2006.01) |
| *H05K 7/20* | (2006.01) |
| *H04L 12/939* | (2013.01) |
| *H04W 4/02* | (2018.01) |
| *H04L 12/751* | (2013.01) |
| *G06F 13/42* | (2006.01) |
| *H05K 1/18* | (2006.01) |
| *G05D 23/19* | (2006.01) |
| *G05D 23/20* | (2006.01) |
| *H04L 12/927* | (2013.01) |
| *H05K 1/02* | (2006.01) |
| *H04L 12/781* | (2013.01) |
| *H04Q 1/04* | (2006.01) |
| *G06F 12/0893* | (2016.01) |
| *H05K 13/04* | (2006.01) |
| *G11C 5/06* | (2006.01) |
| *G06F 11/14* | (2006.01) |
| *G06F 11/34* | (2006.01) |
| *G06F 12/0862* | (2016.01) |
| *G06F 15/80* | (2006.01) |
| *H04L 12/919* | (2013.01) |
| *G06F 12/10* | (2016.01) |
| *G06Q 10/06* | (2012.01) |
| *G07C 5/00* | (2006.01) |
| *H04L 12/28* | (2006.01) |
| *H04L 29/12* | (2006.01) |
| *H04L 9/06* | (2006.01) |
| *H04L 9/14* | (2006.01) |
| *H04L 9/32* | (2006.01) |
| *H04L 12/933* | (2013.01) |
| *H04L 12/947* | (2013.01) |

(52) U.S. Cl.
CPC ......... *G02B 6/4292* (2013.01); *G02B 6/4452* (2013.01); *G06F 3/0613* (2013.01); *G06F 16/9014* (2019.01); *G11C 5/02* (2013.01); *G11C 14/0009* (2013.01); *H03M 7/4056* (2013.01); *H04B 10/25891* (2020.05); *H04L 41/145* (2013.01); *H04L 43/08* (2013.01); *B25J 15/0014* (2013.01); *B65G 1/0492* (2013.01); *G05D 23/1921* (2013.01); *G05D 23/2039* (2013.01); *G06F 1/183* (2013.01); *G06F 1/20* (2013.01); *G06F 3/061* (2013.01); *G06F 3/064* (2013.01); *G06F 3/067* (2013.01); *G06F 3/0611* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/06* (2013.01); *G06Q 10/06314* (2013.01); *G06Q 10/087*

(2013.01); G06Q 10/20 (2013.01); G06Q 50/04 (2013.01); G07C 5/008 (2013.01); G08C 17/02 (2013.01); G08C 2200/00 (2013.01); G11C 5/06 (2013.01); G11C 7/1072 (2013.01); G11C 11/56 (2013.01); H03M 7/30 (2013.01); H03M 7/3084 (2013.01); H03M 7/3086 (2013.01); H03M 7/40 (2013.01); H03M 7/4031 (2013.01); H03M 7/4081 (2013.01); H03M 7/6005 (2013.01); H03M 7/6023 (2013.01); H04B 10/25 (2013.01); H04L 9/0643 (2013.01); H04L 9/14 (2013.01); H04L 9/3247 (2013.01); H04L 9/3263 (2013.01); H04L 12/2809 (2013.01); H04L 29/12009 (2013.01); H04L 41/024 (2013.01); H04L 41/046 (2013.01); H04L 41/082 (2013.01); H04L 41/0813 (2013.01); H04L 41/0896 (2013.01); H04L 41/12 (2013.01); H04L 41/147 (2013.01); H04L 41/5019 (2013.01); H04L 43/065 (2013.01); H04L 43/0817 (2013.01); H04L 43/0876 (2013.01); H04L 43/0894 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/00 (2013.01); H04L 49/15 (2013.01); H04L 49/25 (2013.01); H04L 49/357 (2013.01); H04L 49/45 (2013.01); H04L 49/555 (2013.01); H04L 67/02 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0005 (2013.01); H04Q 11/0062 (2013.01); H04Q 11/0071 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/023 (2013.01); H04W 4/80 (2018.02); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1442 (2013.01); H05K 7/1447 (2013.01); H05K 7/1461 (2013.01); H05K 7/1485 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y04S 10/54 (2013.01); Y10S 901/01 (2013.01)

(56) References Cited

U.S. PATENT DOCUMENTS

| | | | | |
|---|---|---|---|---|
| 8,209,695 | B1 | 6/2012 | Pruyne et al. | |
| 8,631,411 | B1* | 1/2014 | Ghose | H04L 69/329 718/102 |
| 8,756,307 | B1 | 6/2014 | Chen et al. | |
| 9,568,923 | B1* | 2/2017 | Demetriou | H05K 7/20836 |
| 2004/0262409 | A1* | 12/2004 | Crippen | G06F 1/206 236/49.3 |
| 2006/0218285 | A1* | 9/2006 | Talwar | G06F 9/5072 709/227 |
| 2009/0265568 | A1* | 10/2009 | Jackson | G06F 1/3203 713/320 |
| 2010/0217454 | A1* | 8/2010 | Spiers | G05D 23/1932 700/300 |
| 2011/0107332 | A1* | 5/2011 | Bash | G06F 1/206 718/1 |
| 2011/0213508 | A1* | 9/2011 | Mandagere | G06F 1/3203 700/291 |
| 2012/0158206 | A1* | 6/2012 | Longobardi | G05B 13/048 700/300 |
| 2014/0068627 | A1 | 3/2014 | Goh et al. | |
| 2014/0075222 | A1* | 3/2014 | Jackson | G06F 1/329 713/320 |
| 2014/0279168 | A1* | 9/2014 | Malaczynski | G06Q 30/0611 705/26.4 |
| 2014/0298349 | A1* | 10/2014 | Jackson | G06Q 50/06 718/104 |
| 2015/0192980 | A1 | 7/2015 | Sen et al. | |
| 2016/0170469 | A1 | 6/2016 | Sehgal et al. | |
| 2016/0292254 | A1* | 10/2016 | Dhuse | G06F 16/2228 |
| 2016/0323880 | A1* | 11/2016 | Luo | H04L 41/5025 |
| 2017/0192484 | A1* | 7/2017 | Priyadarshi | G06F 1/3228 |
| 2018/0026906 | A1* | 1/2018 | Balle | B65G 1/0492 709/226 |
| 2018/0026910 | A1* | 1/2018 | Balle | H04L 9/14 709/226 |
| 2018/0026913 | A1* | 1/2018 | Balle | B25J 15/0014 709/226 |
| 2018/0027055 | A1* | 1/2018 | Balle | G06F 3/0616 709/226 |
| 2018/0027057 | A1* | 1/2018 | Balle | G02B 6/3893 709/226 |

OTHER PUBLICATIONS

Written opinion for PCT application No. PCT/US2017/038731, dated Sep. 27, 2017 (8 pages).

* cited by examiner

*Data Center 100*

TECHNOLOGIES FOR ASSIGNING WORKLOADS TO BALANCE MULTIPLE RESOURCE ALLOCATION OBJECTIVES

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

During the operation of a cloud based computing environment, in which multiple compute nodes in a network execute workloads on behalf of customers, the administrator of the environment may wish to optimize the operation of the environment to satisfy certain objectives, such as costs savings for the administrator and providing prompt and responsive cloud services to the customers. The cost savings may come in the form of reduced power usage, reduced heat production, and reduced wear on the components of the compute nodes, while the objective of providing prompt and responsive cloud services may weigh in favor of additional compute capacity through additional hardware resources devoted to a workload, higher operating speeds, higher power usage, and increased heat production and wear on the components. As such, a configuration of the compute nodes and assignment of workloads among the compute nodes that is optimized for one or more of the objectives may do so at the cost of insufficiently satisfying other objectives. Furthermore, as the cloud based computing environment performs different workloads over time and phases of resource utilization within each of the workloads may change, an initial assignment workloads among the computing nodes within the environment may vary between meeting one or more of the objectives and not meeting the objectives. As such, it is difficult, in typical cloud based environments, to determine an assignment and ongoing adjustments to the assignment of workloads among the compute nodes to consistently satisfy objectives in a way that does not reduce the achievement of other objectives.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
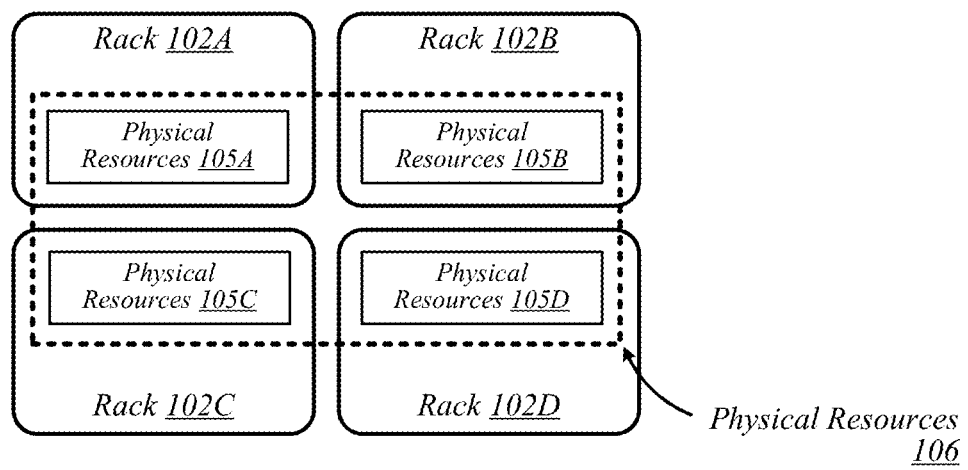
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
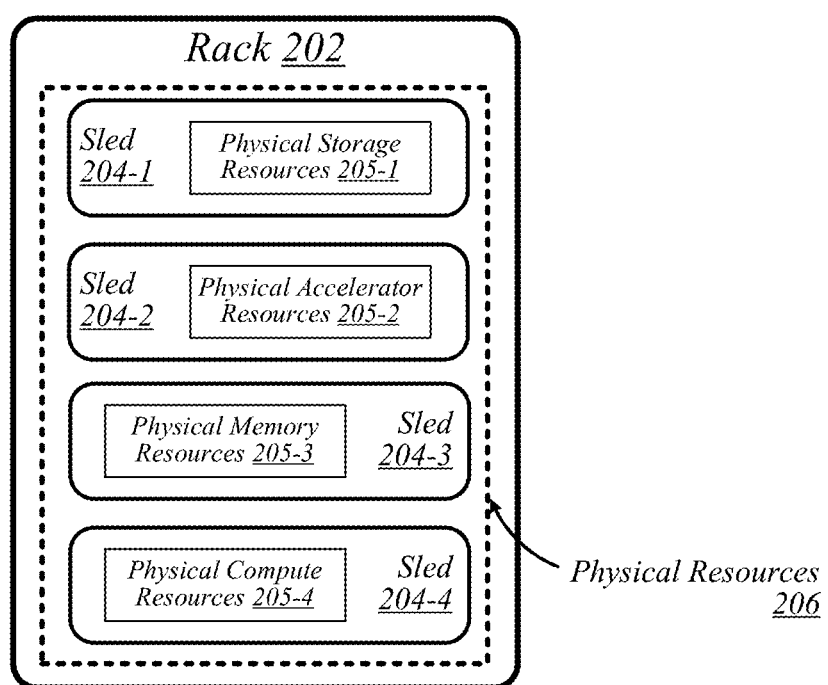
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
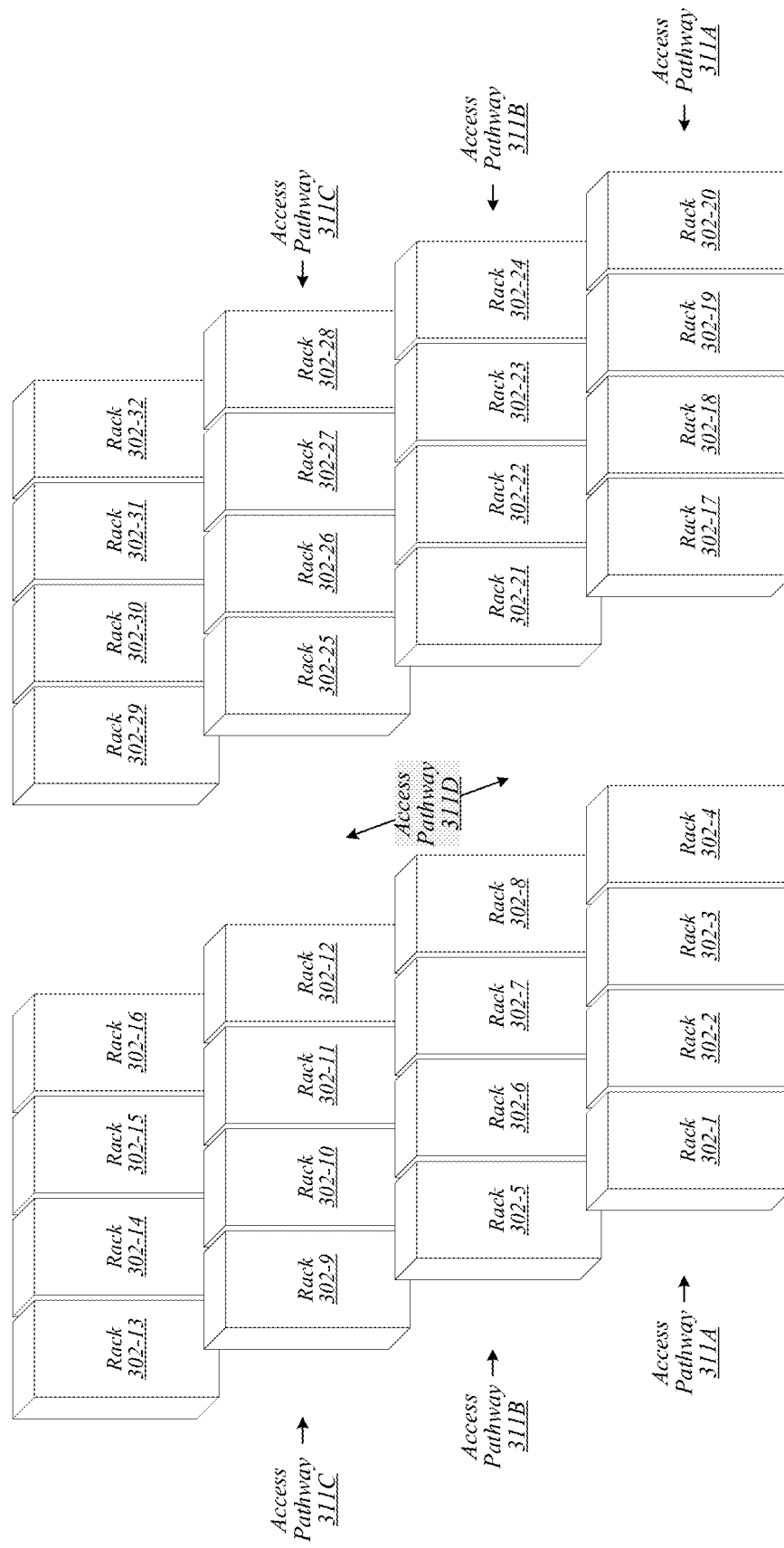
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
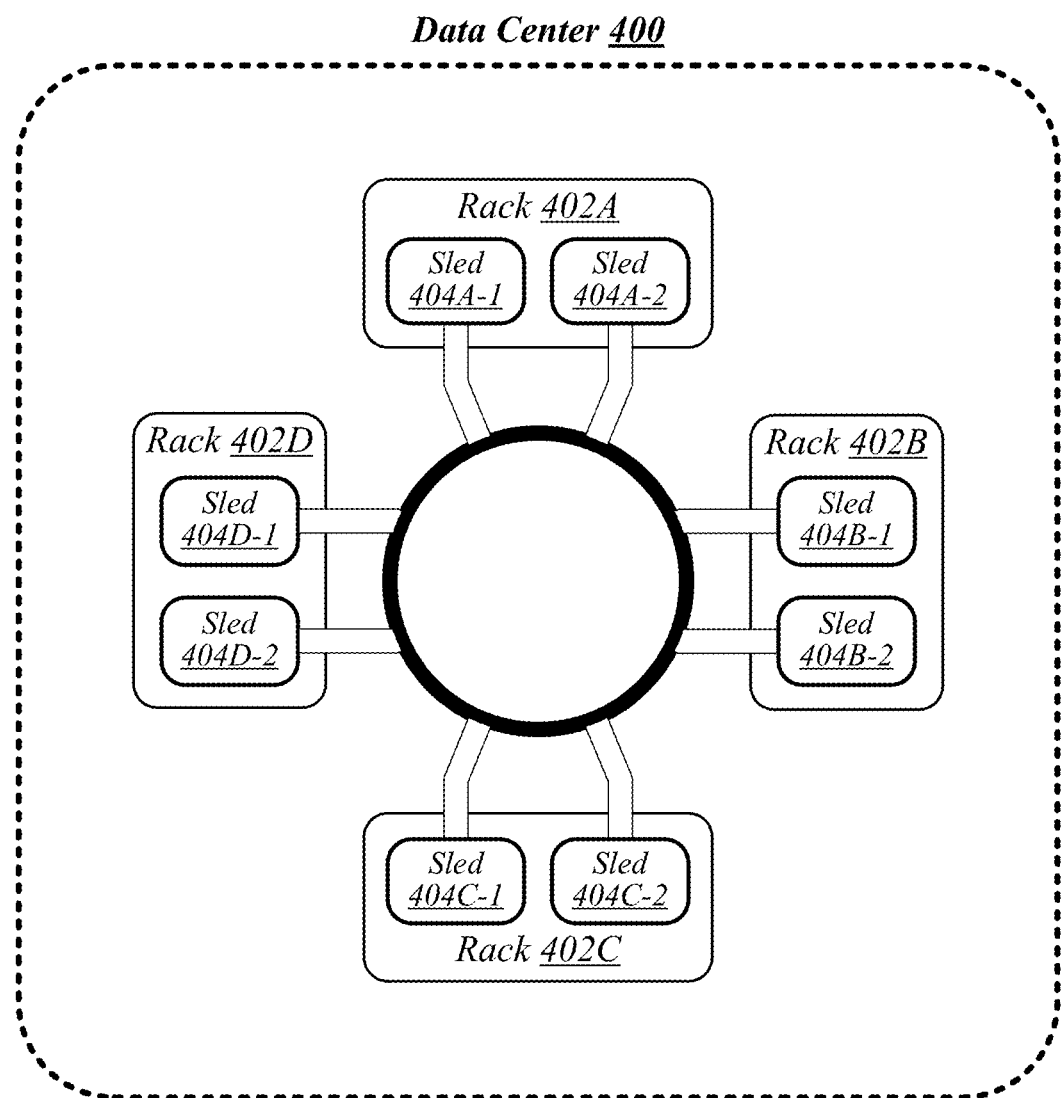
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
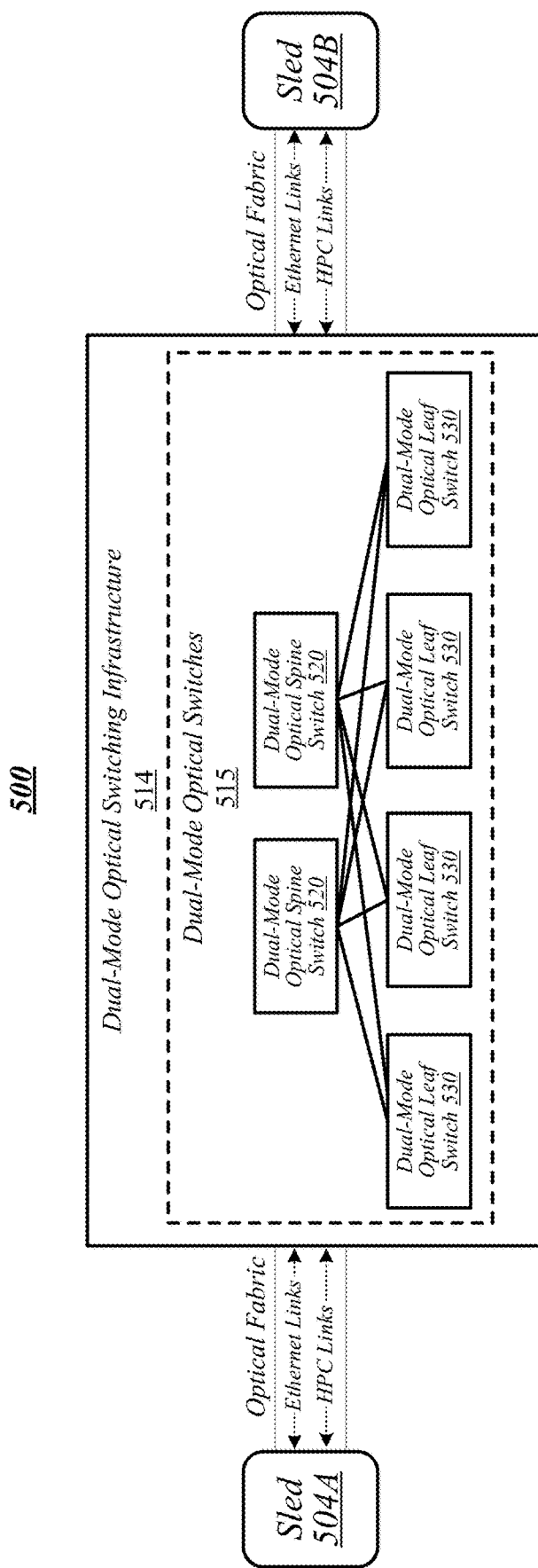
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
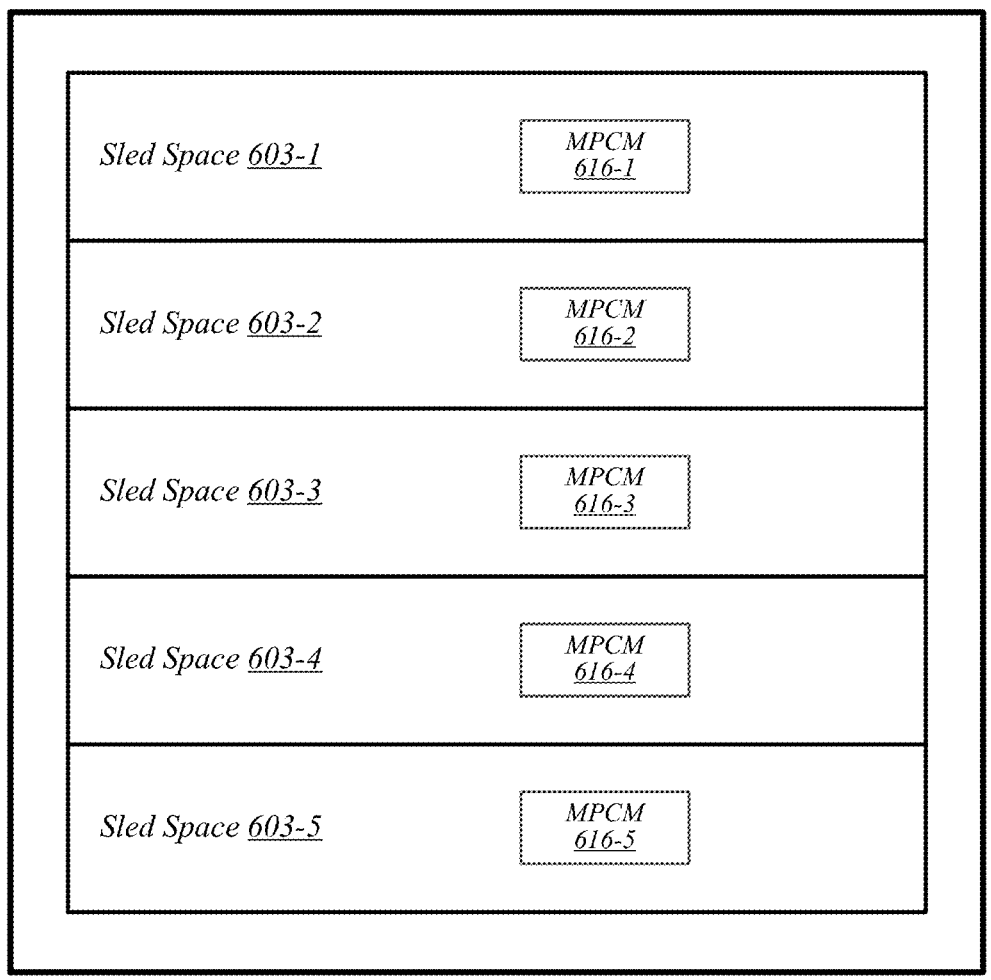
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
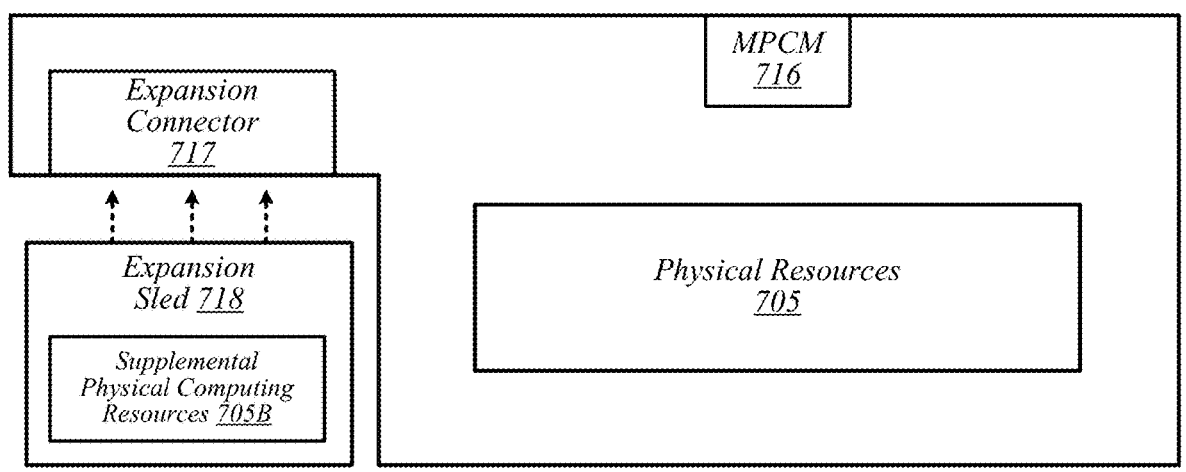
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
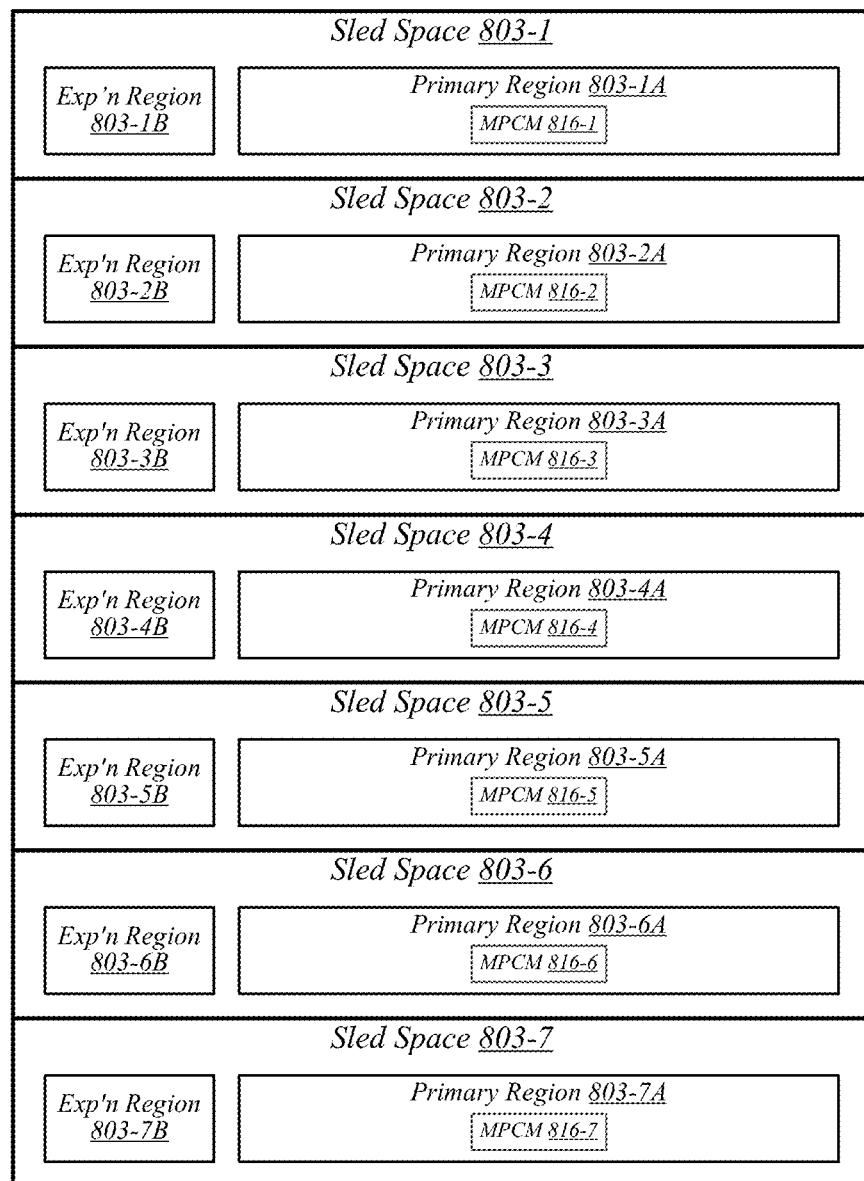
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
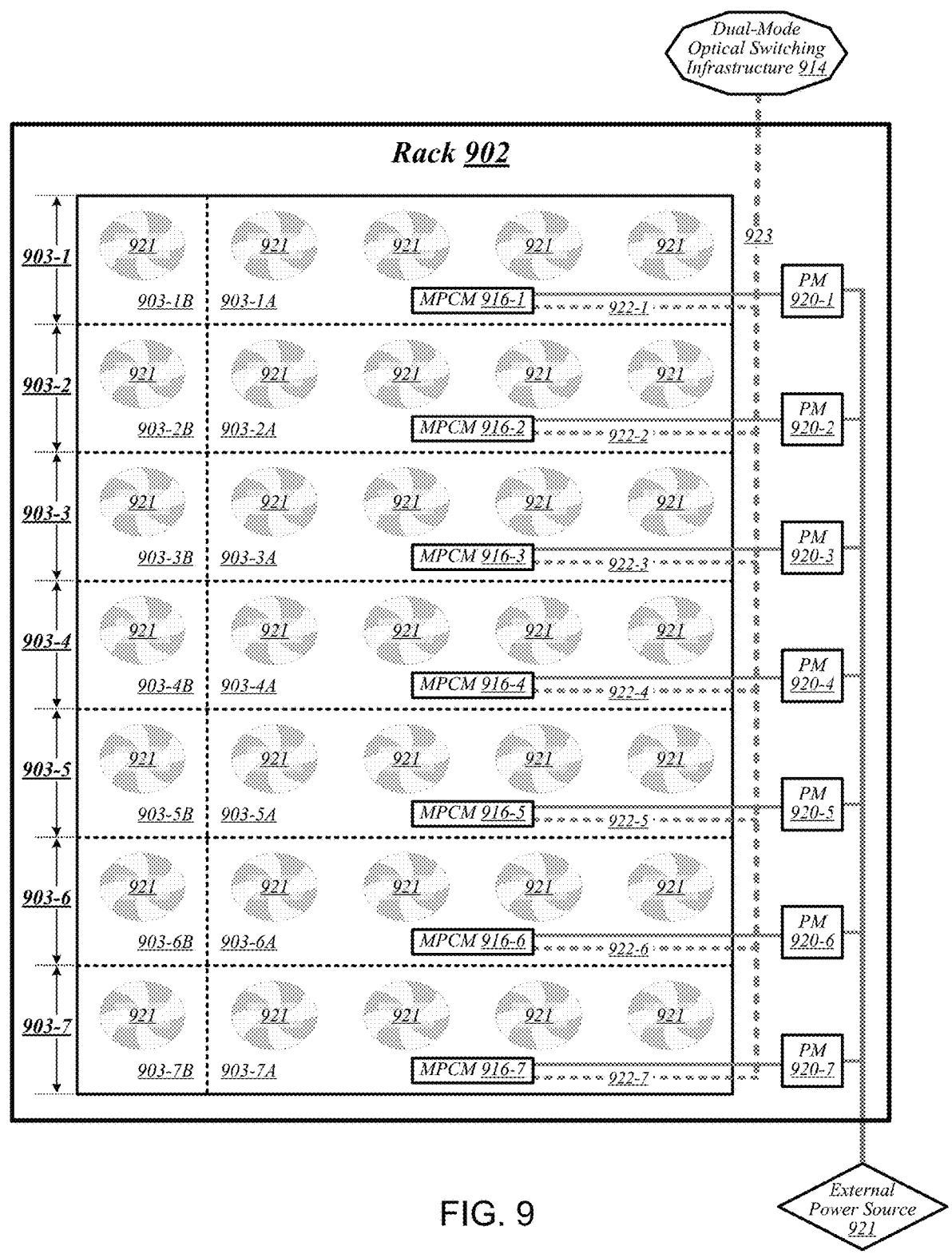
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
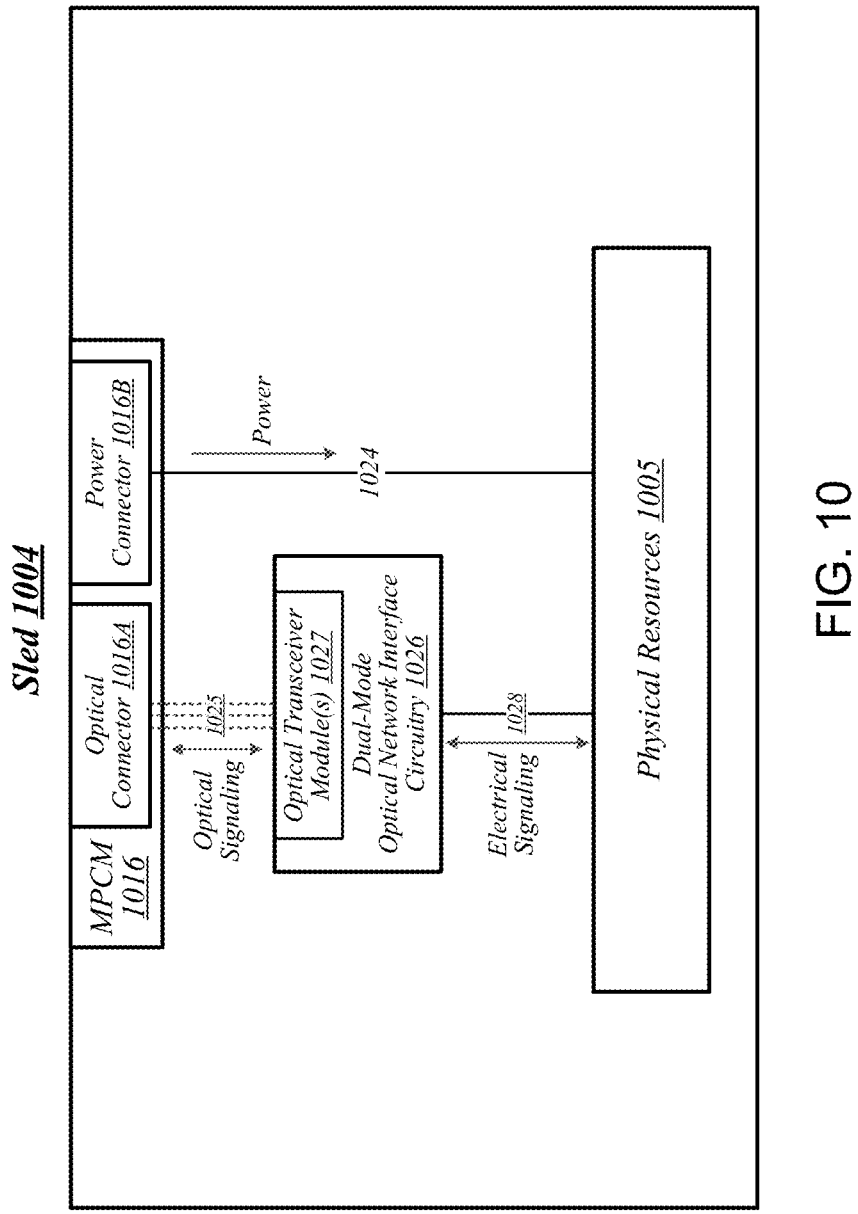
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
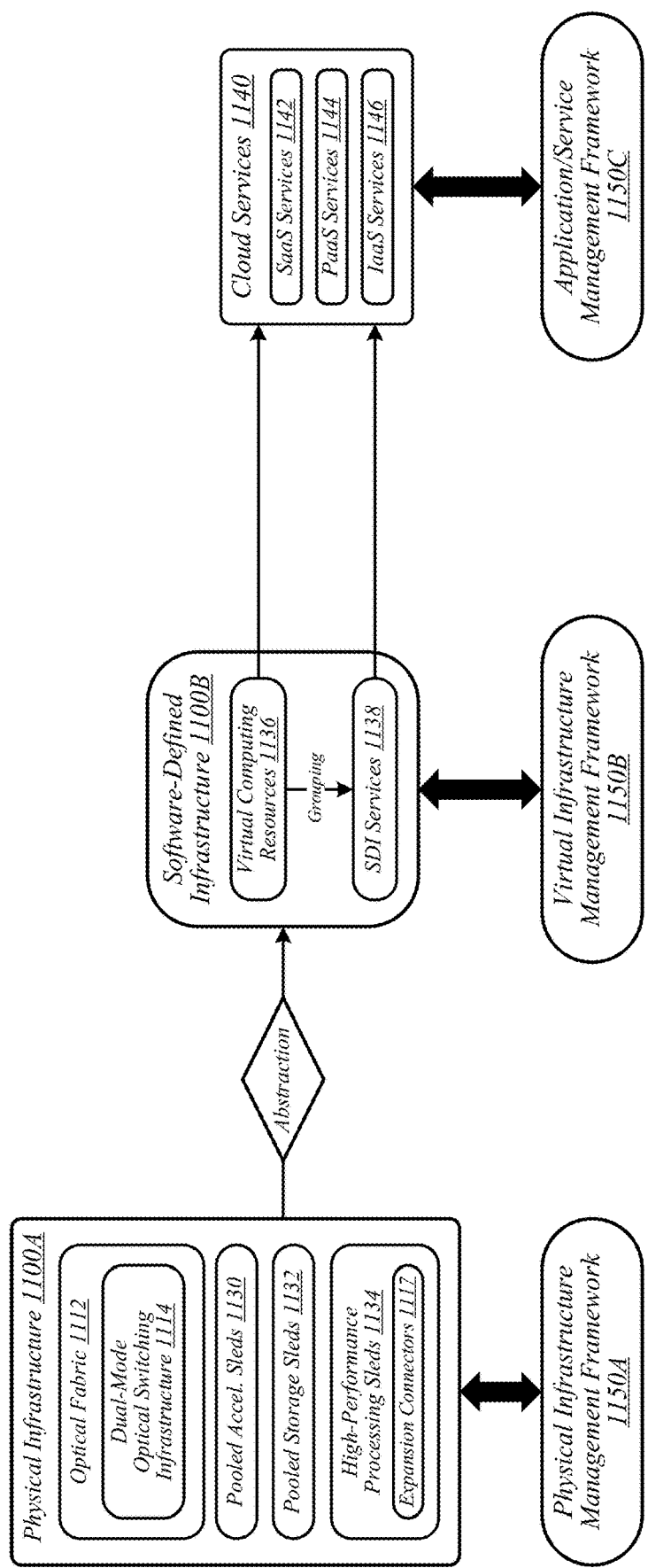
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
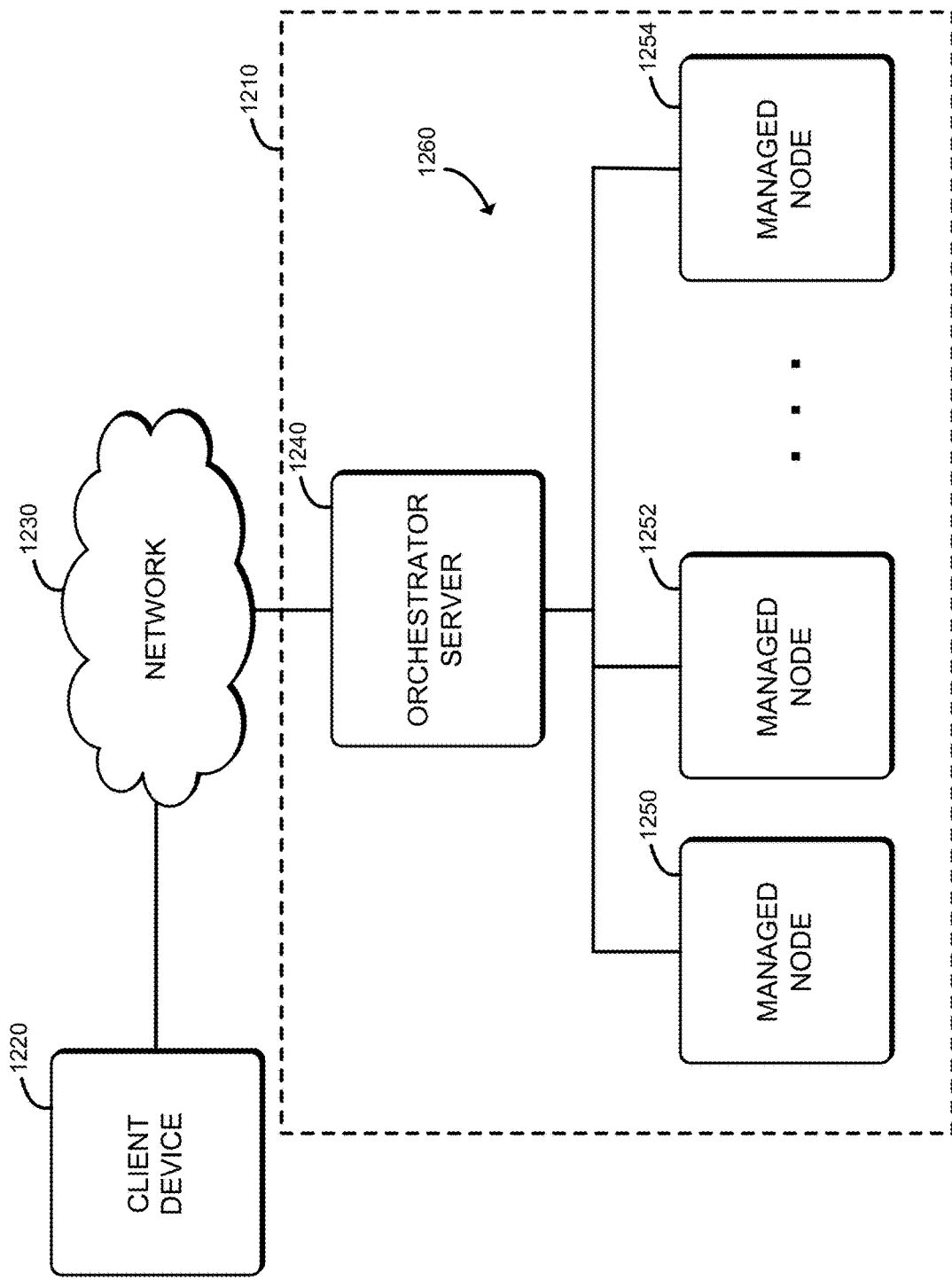
FIG. 12 is a simplified block diagram of at least one embodiment of a system for assigning workloads among a set of managed nodes to balance multiple resource allocation objectives.

As shown in FIG. 12, an illustrative system 1210 for assigning workloads among a set of managed nodes 1260 to balance multiple resource allocation objectives includes an orchestrator server 1240 in communication with the set of managed nodes 1260. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to the managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The system 1210 may be located in a data center and provide storage and compute services (e.g., cloud services) to a client device 1220 that is in communication with the system 1210 through a network 1230. The orchestrator server 1240 may support a cloud operating environment, such as OpenStack, and the managed nodes 1250 may execute one or more applications or processes (i.e., workloads), such as in virtual machines or containers, on behalf of a user of the client device 1220. As discussed in more detail herein, the orchestrator server 1240, in operation, is configured to receive resource allocation objective data indicative of thresholds or goals ("objectives") to be satisfied during the execution of the workloads. Additionally, the orchestrator server 1240 is configured to assign workloads to the managed nodes 1260 and receive telemetry data, which may be embodied as data indicative of the performance and conditions of each managed node 1260 as the managed nodes 1260 execute the workloads assigned to them.

Additionally, in the illustrative embodiment, the orchestrator server 1240 is configured to analyze the telemetry data and determine whether adjustments to the assignment of the workloads among the server and adjustments to the operations of the components of the managed nodes 1260 could be made to increase the satisfaction (also referred to herein as achievement) of one or more of the objectives without decreasing the achievement of any of the other objectives. In other words, in the illustrative embodiment, each objective may be satisfied to a varying degree. For example, in the illustrative embodiment, increasing the achievement may be performed by decreasing the error (e.g., difference) between the measured value (e.g., an operating temperature of a managed node 1260) and the target value (e.g., a target operating temperature). Conversely, decreasing the achievement may be performed by increasing the error (e.g., difference) between the measured value and the target value. By continually making such adjustments to the assignments of the workloads to the managed nodes 1260, the orchestrator server 1240 repeatedly makes "Pareto improvements", until the orchestrator server 1240 determines that no further adjustments can be made without negatively impacting the achievement of one or more of the goals, in which case the orchestrator server 1240 determines the assignment of the workloads among the managed nodes 1260 to be "Pareto-efficient." As such, by adjusting the assignment of the workloads among the managed nodes 1260 (i.e., adjusting the allocation of resources to the workloads), the orchestrator server 1240 may provide a balanced, Pareto-efficient solution, that serves all of the objectives on an ongoing basis.

Figure 13:
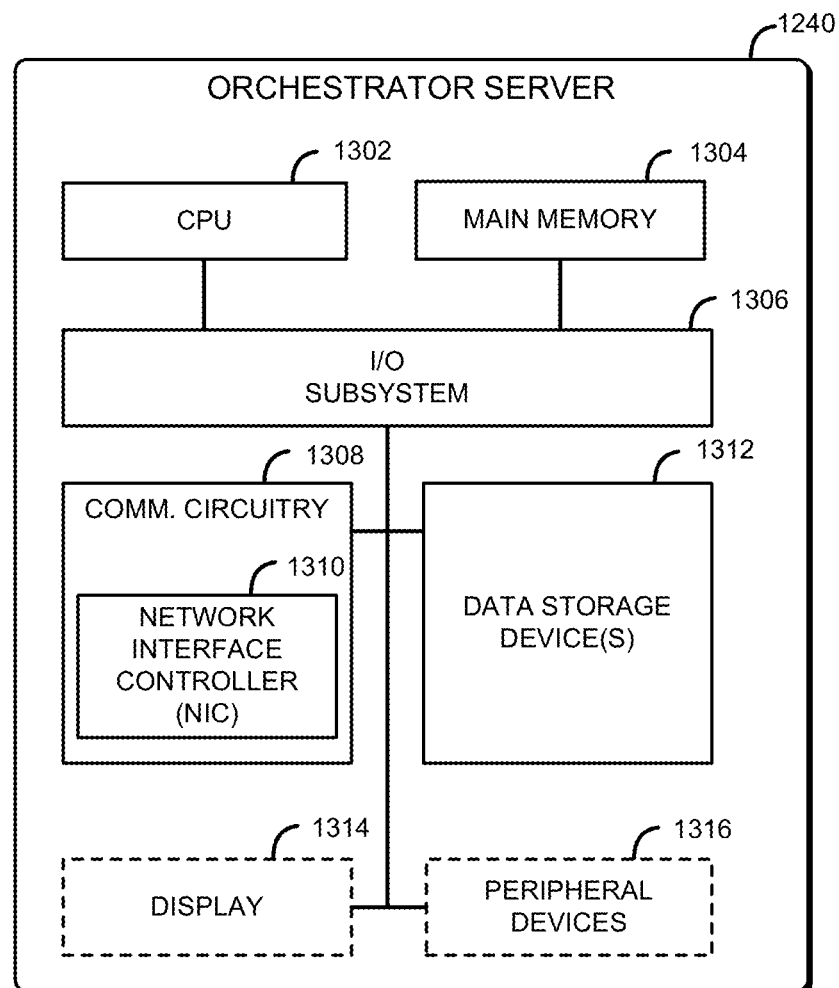
FIG. 13 is a simplified block diagram of at least one embodiment of an orchestrator server of the system of FIG. 12.

Referring now to FIG. 13, the orchestrator server 1240 may be embodied as any type of compute device capable of performing the functions described herein, including issuing a request to have cloud services performed, receiving results of the cloud services, assigning workloads to compute devices, analyzing telemetry data indicative of performance and conditions (e.g., resource utilization, one or more temperatures, fan speeds, etc.) as the workloads are executed, identifying resource contention among workloads, predicting future resource utilization phases and future resource contention, and adjusting the assignments of the workloads to manage the achievement of multiple resource allocation objectives as the workloads are performed. For example, the orchestrator server 1240 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative orchestrator server 1240 includes a central processing unit (CPU) 1302, a main memory 1304, an input/output (I/O) subsystem 1306, communication circuitry 1308, and one or more data storage devices 1312. Of course, in other embodiments, the orchestrator server 1240 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. As discussed above, the managed node 1260 may include resources distributed across multiple sleds and in such embodiments, the CPU 1302 may include portions thereof located on the same sled or different sled. Similarly, the main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation such as telemetry data, resource allocation objective data, workload labels, workload classifications, workload adjustment data, operating systems, applications, programs, libraries, and drivers. As discussed above, the managed node 1260 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the orchestrator server 1240. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the orchestrator server 1240, on a single integrated circuit chip.

The communication circuitry 1308 may be embodied as any communication circuit, device, or collection thereof, capable of enabling communications over the network 1230 between the orchestrator server 1240 and another compute device (e.g., the client device 1220, and/or the managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughtercards, network interface cards, controller chips, chipsets, or other devices that may be used by the orchestrator server 1240 to connect with another compute device (e.g., the client device 1220 and/or the managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a local processor (not shown) and/or a local memory (not shown) that are both local to the NIC 1310. In such embodiments, the local processor of the NIC 1310 may be capable of performing one or more of the functions of the CPU 1302 described herein. Additionally or alternatively, in such embodiments, the local memory of the NIC 1310 may be integrated into one or more components of the orchestrator server 1240 at the board level, socket level, chip level, and/or other levels. As discussed above, the managed node 1260 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, memory devices and circuits, memory cards, hard disk drives, solid-state drives, or other data storage devices. Each data storage device 1312 may include a system partition that stores data and firmware code for the data storage device 1312. Each data storage device 1312 may also include an operating system partition that stores data files and executables for an operating system.

Additionally, the orchestrator server 1240 may include a display 1314. The display 1314 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 1314 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Additionally or alternatively, the orchestrator server 1240 may include one or more peripheral devices 1316. Such peripheral devices 1316 may include any type of peripheral device commonly found in a compute device such as speakers, a mouse, a keyboard, and/or other input/output devices, interface devices, and/or other peripheral devices.

The client device 1220 and the managed nodes 1260 may have components similar to those described in FIG. 13. The description of those components of the orchestrator server 1240 is equally applicable to the description of components of the client device 1220 and the managed nodes 1260 and is not repeated herein for clarity of the description. Further, it should be appreciated that any of the client device 1220 and the managed nodes 1260 may include other components, sub-components, and devices commonly found in a computing device, which are not discussed above in reference to the orchestrator server 1240 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
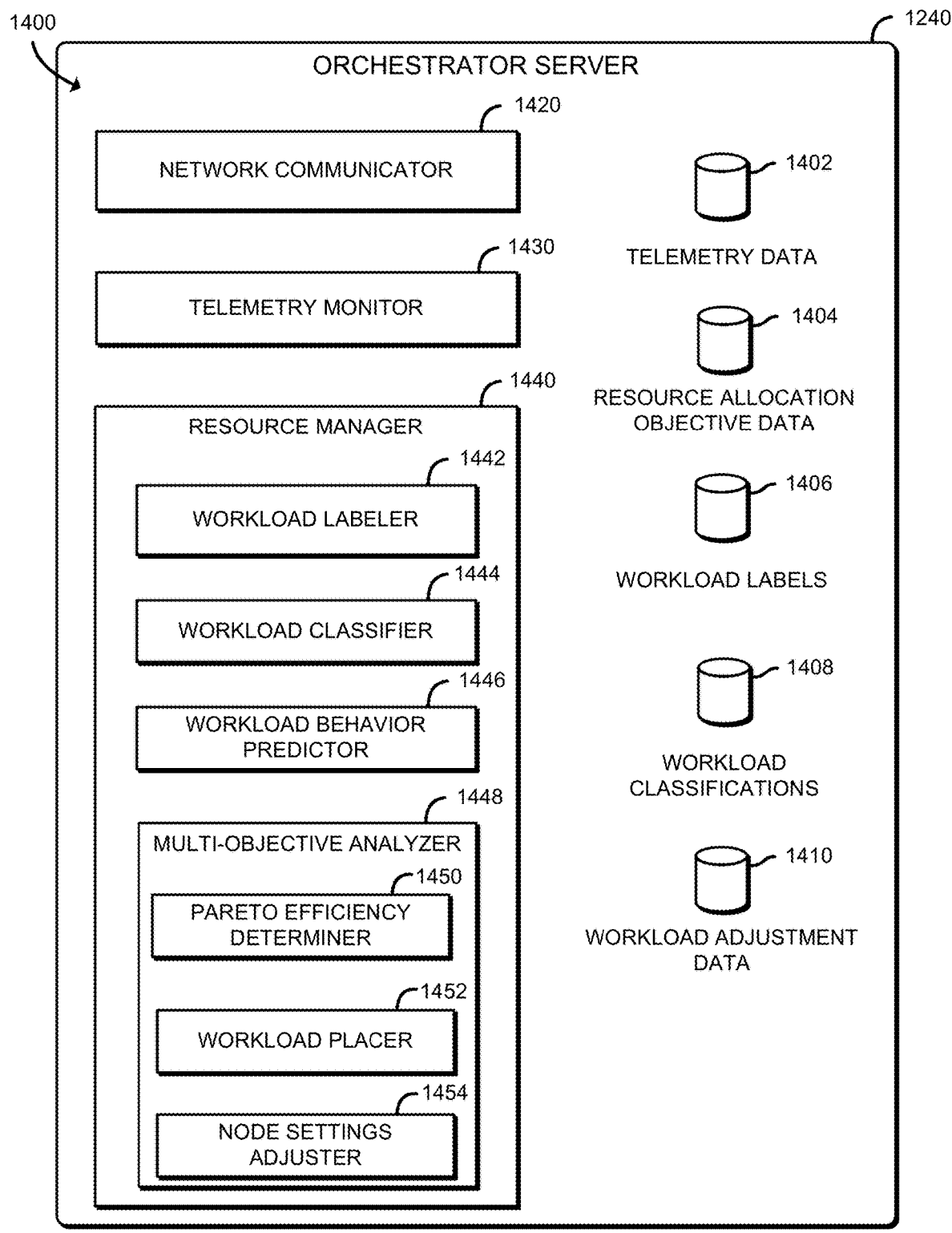
FIG. 14 is a simplified block diagram of at least one embodiment of an environment that may be established by the orchestrator server of FIGS. 12 and 13.

Referring now to FIG. 14, in the illustrative embodiment, the orchestrator server 1240 may establish an environment 1400 during operation. The illustrative environment 1400 includes a network communicator 1420, a telemetry monitor 1430, and a resource manager 1440. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, telemetry monitor circuitry 1430, resource manager circuitry 1440, etc.). It should be appreciated that, in such embodiments, one or more of the network communicator circuitry 1420, telemetry monitor circuitry 1430, or resource manager circuitry 1440 may form a portion of one or more of the CPU 1302, the main memory 1304, the I/O subsystem 1306, and/or other components of the orchestrator server 1240. In the illustrative embodiment, the environment 1400 includes telemetry data 1402 which may be embodied as data indicative of the performance and conditions (e.g., resource utilization, operating frequencies, power usage, one or more temperatures, fan speeds, etc.) of each managed node 1260 as the managed nodes 1260 execute the workloads assigned to them. Additionally, the illustrative environment 1400 includes resource allocation objective data 1404 indicative of user-defined thresholds or goals ("objectives") to be satisfied during the execution of the workloads. In the illustrative embodiment, the objectives pertain to heat production, power consumption, life expectancy, and performance of the components of the managed nodes 1260. Further, the illustrative environment 1400 includes workload labels 1406 which may be embodied as any identifiers (e.g., process numbers, executable file names, alphanumeric tags, etc.) that uniquely identify each workload executed by the managed nodes 1260. In addition, the illustrative environment 1400 includes workload classifications 1408 which may be embodied as any data indicative of the general resource utilization tendencies of each workload (e.g., processor intensive, memory intensive, network bandwidth intensive, etc.). Further, the illustrative environment 1400 includes workload adjustment data 1412 which may be embodied as any data indicative of reassignments (e.g., live migrations) of one or more workloads from one managed node 1260 to another managed node 1260 and/or adjustments to settings for components within each managed node 1260, such as target operating temperatures, target power usage of the components, processor capacity (e.g., a number of cores to be used, a clock speed, a percentage of available processor cycles, etc.) available to one or more workloads, memory resource capacity (e.g., amount of memory to be used and/or frequency of memory accesses to volatile memory and/or non-volatile memory) available to one or more workloads, and/or communication circuitry capacity (e.g., network bandwidth) available to one or more workloads.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1240, respectively. To do so, the network communicator 1420 is configured to receive and process data packets from one system or computing device (e.g., the client device 1220) and to prepare and send data packets to another computing device or system (e.g., the managed nodes 1260). Accordingly, in some embodiments, at least a portion of the functionality of the network communicator 1420 may be performed by the communication circuitry 1308, and, in the illustrative embodiment, by the NIC 1310.

The telemetry monitor 1430, which may be embodied as hardware, firmware, software, virtualized hardware, emulated architecture, and/or a combination thereof as discussed above, is configured to collect the telemetry data 1402 from the managed nodes 1260 as the managed nodes 1260 execute the workloads assigned to them. The telemetry monitor 1430 may actively poll each of the managed nodes 1260 for updated telemetry data 1402 on an ongoing basis or may passively receive telemetry data 1402 from the managed nodes 1260, such as by listening on a particular network port for updated telemetry data 1402. The telemetry monitor 1430 may further parse and categorize the telemetry data 1402, such as by separating the telemetry data 1402 into an individual file or data set for each managed node 1260.

The resource manager 1440, which may be embodied as hardware, firmware, software, virtualized hardware, emulated architecture, and/or a combination thereof, is configured to generate data analytics from the telemetry data 1402, identify the workloads, classify the workloads, identify trends in the resource utilization of the workloads, identify resource contention among the workloads, predict future resource utilizations of the workloads and future resource contention among the workloads, determine whether the assignment of the workloads among the managed nodes 1260 is Pareto-efficient, and adjust the assignments of the workloads to the managed nodes 1260 and the settings of the managed nodes 1260 to provide Pareto improvements (i.e., increasing the achievement of at least one resource allocation objective without negatively affecting the achievement of any other resource allocation objective). To do so, the resource manager 1440 includes a workload labeler 1442, a workload classifier 1444, a workload behavior predictor 1446, and a multi-objective analyzer 1448 that includes a Pareto efficiency determiner 1450, a workload placer 1452, and a node settings adjuster 1454. The workload labeler 1442, in the illustrative embodiment, is configured to assign a workload label 1406 to each workload presently performed or scheduled to be performed by one or more of the managed nodes 1260. The workload labeler 1442 may generate the workload label 1406 as a function of an executable name of the workload, a hash of all or a portion of the code of the workload, or based on any other method to uniquely identify each workload. The workload classifier 1444, in the illustrative embodiment, is configured to categorize each labeled workload based on the resource utilization of each workload. For example, the workload classifier 1444 may categorize one set of labeled workloads as being consistently processor intensive, another set of labeled workloads as being consistently memory intensive, and another set of workloads as having phases of different resource utilization (high memory use and low processor use, followed by high processor use and low memory use, etc.).

The workload behavior predictor 1446, in the illustrative embodiment, is configured to analyze the telemetry data 1402 and the workload classifications 1408 to predict future resource utilization needs of the various workloads based on their previous usage and potential resource contention among the workloads. The workload behavior predictor 1446 may be configured to identify patterns in the resource utilization phases (e.g., period of high processor usage and low memory usage, periods of low processor usage and high memory usage, etc.) of the workloads, determine a present resource utilization phase of a given workload, predict the next resource utilization phase based on the patterns, and determine an amount of remaining time until the workload transitions to the predicted resource utilization phase. The multi-objective analyzer 1448, in the illustrative embodiment, is configured to balance the resource allocation objectives defined in the resource allocation objective data 1404, determine, based on the telemetry data 1402, whether the present allocation of the resources in the managed nodes 1260 is Pareto-efficient, and if not, determine an adjustment that provides a Pareto improvement (e.g., an increase in the achievement of at least one of the objectives without decreasing the achievement of any of the other objectives). To do so, in the illustrative embodiment, the multi-objective analyzer 1448 includes the Pareto efficiency determiner 1450, the workload placer 1452, and the node settings adjuster 1454.

The Pareto efficiency determiner 1450 in the illustrative embodiment, is configured to determine, as a function of the telemetry data 1402, including the present resource utilizations of the workloads and the predicted behavior of the workloads, whether an adjustment can be made to any of the assignments of the workloads and/or the settings of the components of the managed nodes 1260 to increase the achievement of one or more of the resource allocation objectives without decreasing the achievement of the other resource allocation objectives. In the illustrative embodiment, the Pareto efficiency determiner may do so by modeling or simulating the set of managed nodes 1260, their power consumption, heat generation, compute capacity, and other factors in response to various adjustments to the assignments of workloads and/or the setting of components within the managed nodes 1260, define a Pareto frontier indicative of a set of resource allocations that are all Pareto-efficient, determine whether the present resource allocation is already on the Pareto frontier, and if not, what adjustment to the allocations would reach the Pareto frontier. The Pareto efficiency determiner may determine the Pareto frontier, P(Y), as follows:

$$f:R^n \to R^m \quad \text{(Equation 1)}$$

In the above equation, f is a function of the set of managed nodes 1260, modeled by the Pareto efficiency determiner, that is indicative of the response of the managed nodes 1260 to adjustments to the assignments of workloads. $R^n$ is a metric space of possible allocations (i.e., assignments of workloads) and $R^m$ represents a set of criterion vectors. In the following equation, X is a compact set of feasible decisions in the metric space, le, and Y is the feasible set of criterion vectors in $R^m$, as follows:

$$Y=\{y \in R^m : y=f(x), x \in X\} \quad \text{(Equation 2)}$$

Furthermore, a point y" defined in Equation 3 below dominates another point y' defined in Equation 4.

$$y'' \in R^m \quad \text{(Equation 3)}$$

$$y' \in R^m \quad \text{(Equation 4)}$$

As such, the Pareto frontier may be represented as follows:

$$P(Y)=\{y' \in Y : \{y'' \in Y : y'' > y', y'' \neq y'\} = \emptyset\} \quad \text{(Equation 5)}$$

The workload placer 1452, in the illustrative embodiment, is configured to initially assign workloads to the various managed nodes 1260 and reassign the workloads among the managed nodes 1260 to provide a Pareto improvement identified by the Pareto efficiency determiner 1450. Similarly, the node settings adjuster 1454, in the illustrative embodiment, is configured to apply one or more adjustments to the settings within the managed nodes 1260 to provide or restrict the resources available to the workloads in accordance with a Pareto improvement determined by the Pareto efficiency determiner 1450. The settings may be associated with the operating system and/or the firmware or drivers of the components of the managed nodes 1260.

It should be appreciated that each of the workload labeler 1442, the workload classifier 1444, the workload behavior predictor 1446, the multi-objective analyzer 1448, the Pareto efficiency determiner 1450, the workload placer 1452, and the node settings adjuster 1454 may be separately embodied as hardware, firmware, software, virtualized hardware, emulated architecture, and/or a combination thereof. For example, the workload labeler 1442 may be embodied as a hardware component, while the workload classifier 1444, the workload behavior predictor 1446, the multi-objective analyzer 1448, the Pareto efficiency determiner 1450, the workload placer 1452, and the node settings adjuster 1454 are embodied as virtualized hardware components or as some other combination of hardware, firmware, software, virtualized hardware, emulated architecture, and/or a combination thereof.

Figure 15:
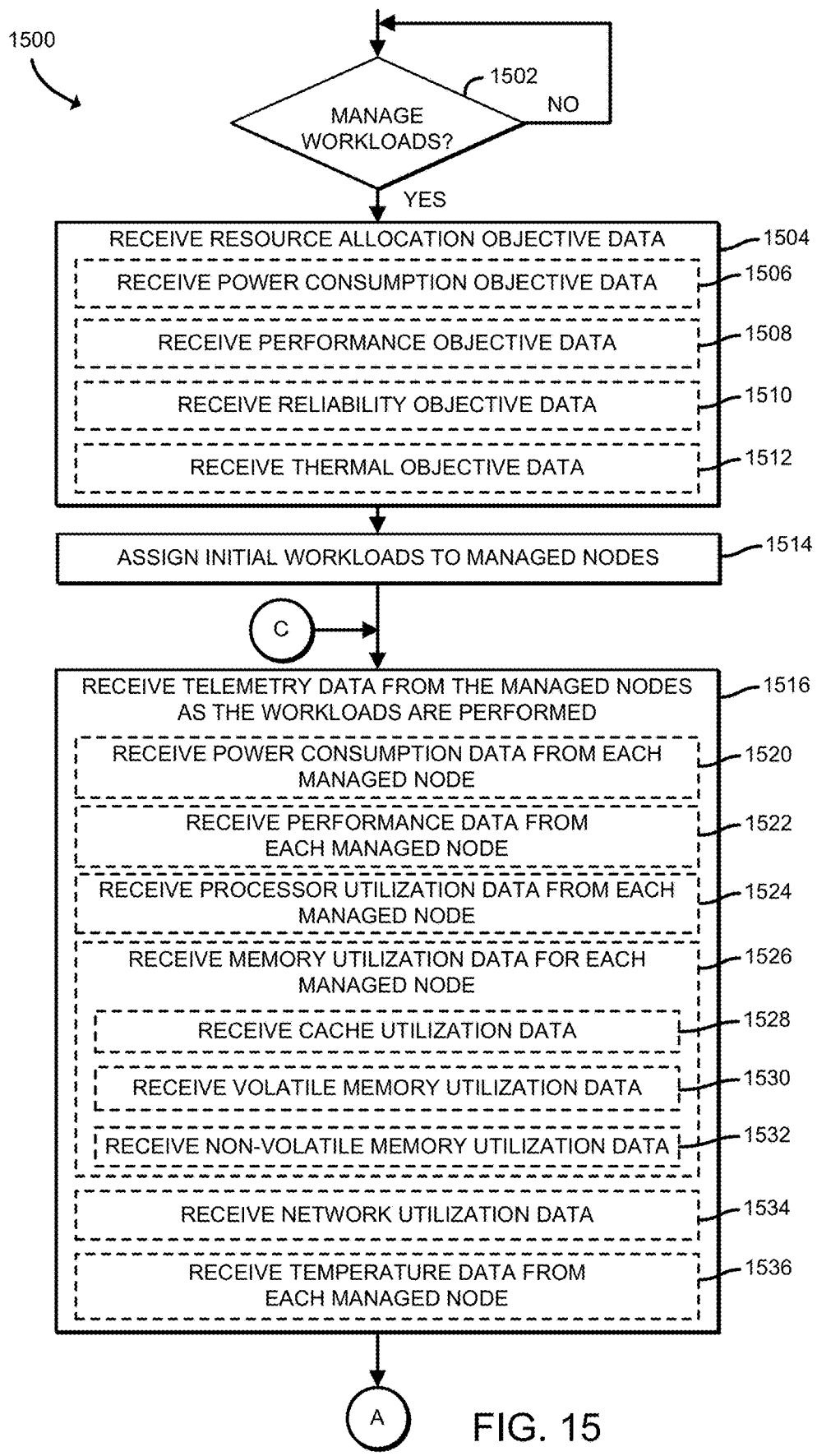
FIGS. 15-17 are a simplified flow diagram of at least one embodiment of a method for assigning workloads among a set of managed nodes to balance multiple resource allocation objectives that may be performed by the orchestrator server of FIGS. 12-14.

Referring now to FIG. 15, in use, the orchestrator server 1240 may execute a method 1500 for assigning workloads among the managed nodes 1260 to balance multiple resource allocation objectives. The method 1500 begins with block 1502, in which the orchestrator server 1240 determines whether to manage workloads to balance resource allocation objectives. In the illustrative embodiment, the orchestrator server 1240 determines to manage workloads if the orchestrator server 1240 is powered on, in communication with the managed nodes 1260, and has received at least one request from the client device 1220 to provide cloud services (i.e., to perform one or more workloads). In other embodiments, the orchestrator server 1240 may determine whether to manage workloads based on other factors. Regardless, in response to a determination to manage workloads, in the illustrative embodiment, the method 1500 advances to block 1504 in which the orchestrator server 1240 receives resource allocation objective data (e.g., the resource allocation objective data 1404). In doing so, the orchestrator server 1240 may receive the resource allocation objective data 1404 from a user (e.g., an administrator) through a graphical user interface (not shown), from a configuration file, or from another source. In receiving the resource allocation objective data 1404, the orchestrator server 1240 may receive power consumption objective data indicative of a target power usage or threshold amount of power usage of the managed nodes 1260 as they execute the workloads, as indicated in block 1506. The orchestrator server 1240, in the illustrative embodiment, may also receive performance objective data, indicative of a target speed at which workloads are to be executed (e.g., a processor clock speed, a memory clock speed, I/O operations per second, a target time period in which to complete execution of a workload, etc.), as indicated in block 1508. Additionally or alternatively, the orchestrator server 1240 may receive reliability objective data indicative of a target life cycle of one or more of the managed nodes 1260 or components therein (e.g., a target life cycle of a data storage device, a target life cycle of a cooling fan, etc.), as indicated in block 1510. As indicated in block 1512, the orchestrator server 1240 may also receive thermal objective data indicative of one or more target temperatures in the managed nodes 1260.

After receiving the resource allocation objective data 1404, in the illustrative embodiment, the method 1500 advances to block 1514 in which the orchestrator server 1240 assigns initial workloads to the managed nodes 1260. In the illustrative embodiment, the orchestrator server 1240 has not received telemetry data 1402 that would inform a decision as to where the workloads are to be assigned among the managed nodes 1260. As such, the orchestrator server 1240 may assign the workloads to the managed nodes 1260 based on any suitable method, such as assigning the each workload to the first available managed node that is idle (i.e., is not presently executing a workload), randomly assigning the workloads, or by any other method.

Having assigned the workloads, the method 1500 advances to block 1516 in which the orchestrator server 1240 receives telemetry data 1402 from the managed nodes 1260 as the workloads are performed (i.e., executed). In receiving the telemetry data 1402, the orchestrator server 1240 may receive power consumption data indicative of an amount of power (e.g., Watts) consumed by each managed node 1260, as indicated in block 1520. The orchestrator server 1240 may also receive performance data from each managed node 1260 indicative of a speed at which the workloads are performed, as indicated in block 1522. As such, the performance data may be embodied as an amount of time consumed to complete a function or task associated with a workload. Further, as indicated in block 1524, the orchestrator server 1240 may receive processor utilization data indicative of an amount of processor usage consumed by each workload performed by each managed node 1260. Moreover, as indicated in block 1526, the orchestrator server 1240 may receive memory utilization data for each managed node 1260. The memory utilization data may be embodied as Intel Cache Allocation Technology (CAT) data, Intel Cache Monitoring Technology (CMT) data, Intel Memory Bandwidth Monitoring (MBM) data, and/or other data indicative of an amount or frequency of memory use by each workload performed by each managed node 1260.

In receiving the memory utilization data, the orchestrator server 1240 may receive cache utilization data indicative of a frequency of cache accesses associated with a workload and/or cache miss rate information, as indicated in block 1528. Additionally or alternatively, as indicated in block 1530, in receiving the memory utilization data, the orchestrator server 1240 may receive volatile memory utilization data indicative of an amount volatile memory (e.g., the main memory 1304) used, a frequency of accesses to the volatile memory, page fault data, and/or other information indicative of the utilization of the volatile memory within each managed node 1260. The orchestrator server 1240 may additionally or alternatively receive non-volatile memory utilization data indicative of the amount of data stored and/or retrieved from the data storage devices 1312 and/or a frequency at which each workload issues write requests and/or read requests to the data storage devices 1312 in each managed node 1260, as indicated in block 1532.

In receiving the telemetry data 1402, the orchestrator server 1240 may additionally or alternatively receive network utilization data indicative of an amount of network bandwidth (e.g., capacity of the communication circuitry) used by each workload performed by each managed node 1260, as indicated in block 1534. The orchestrator server 1240 may additionally receive temperature data from each managed node 1260 indicative of one or more temperatures within the managed nodes 1260. After receiving the telemetry data 1402, the method 1500 advances to block 1538 of FIG. 16, in which the orchestrator server 1240 generates data analytics as the workloads are being performed.

Figure 16:
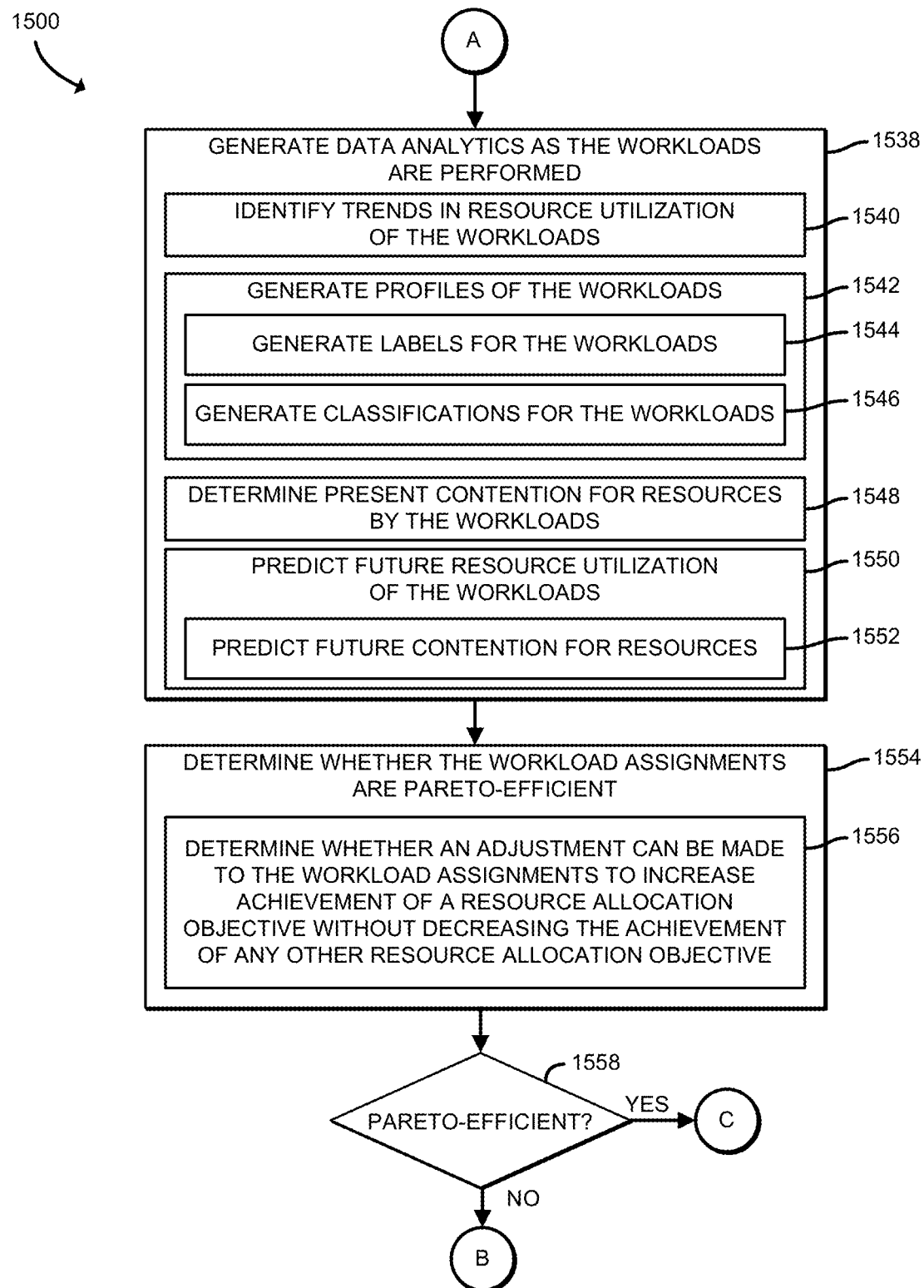

Referring now to FIG. 16, in generating the data analytics, in the illustrative embodiment, the orchestrator server 1240 identifies trends in resource utilizations of the workloads, as indicated in block 1540. For example, the orchestrator server 1240 may determine that a particular workload experiences a phase of high processor utilization and low memory utilization that is typically followed by a phase of low processor utilization and high memory utilization, and that another workload experiences similar phases, but at a different frequency or at a time offset from the other workload. In generating the data analytics, the orchestrator server 1240, in the illustrative embodiment, also generates profiles of the workloads, as indicated in block 1542. In doing so, in the illustrative embodiment, the orchestrator server 1240 generates the labels 1406 for the workloads to uniquely identify each workload, as indicated in block 1544. Additionally, in the illustrative embodiment, the orchestrator server 1240 generates the classifications 1408 of the workloads, as indicated in block 1546.

In the illustrative embodiment, as indicated in block 1548, in generating the data analytics, the orchestrator server 1240 also determines present contention for resources by the workloads. For example, the orchestrator server 1240 may identify two workloads executed concurrently by the same managed node 1260 that are both presently in a high processor utilization phase, causing contention for that resource of the managed node 1260. Similarly, the orchestrator server 1240 may identify workloads executed by a particular managed node 1260 that are concurrently in a phase of high memory utilization or high network bandwidth utilization, causing contention for those resources. In doing so, the orchestrator server 1240 may determine whether, at the heightened resource utilization, the available capacity of the resource subject to contention is less than the amount requested by the workloads executed by that managed node 1260, and if so, store an indicator to potentially adjust the assignment of those workloads among the managed nodes 1260. Additionally, in the illustrative embodiment, the orchestrator server 1240 predicts future resource utilization phases of the workloads, such as by comparing a present resource utilization of each workload to the trends identified in block 1540 to determine the present phase of each workload, and then identifying the upcoming phases of the workloads from the trends, as indicated in block 1550. In doing so, in block 1552, the orchestrator server 1240 predicts future contention for resources using an analysis similar to that described above in block 1548, but using the predicted future resource utilization rather than the present resource utilization of the workloads.

After generating the data analytics, the method 1500 advances to block 1554, in which the orchestrator server 1240 determines whether the workload assignments are Pareto-efficient. In doing so, in the illustrative embodiment, the orchestrator server 1240 determines whether an adjustment can be made to the workload assignments to increase the achievement of a resource allocation objective (e.g., a target performance), without decreasing the achievement of any other resource allocation objective (e.g., a target power consumption, a temperature threshold, etc.), as indicated in block 1556. As described above, the orchestrator server 1240 may determine the Pareto frontier based on a model of the reactions of the managed nodes 1260 to adjustments to the assignment of workloads, and determine whether the present state of the allocation of resources is already on the Pareto frontier. In block 1558, the orchestrator server 1240 determines the subsequent steps based on whether the orchestrator server 1240 determined that the present allocation of resources (e.g., assignment of workloads) is Pareto-efficient. If so, the method 1500 loops back to block 1516 of FIG. 15, in which the orchestrator server 1240 again receives telemetry data from the managed nodes 1260 as the workloads continue to be performed. Otherwise, the method 1500 advances to block 1560 of FIG. 17, in which the orchestrator server 1240 determines adjustments to the workload assignments to provide a Pareto improvement (i.e., an adjustment to move the allocation of resources closer to the Pareto frontier).

Figure 17:
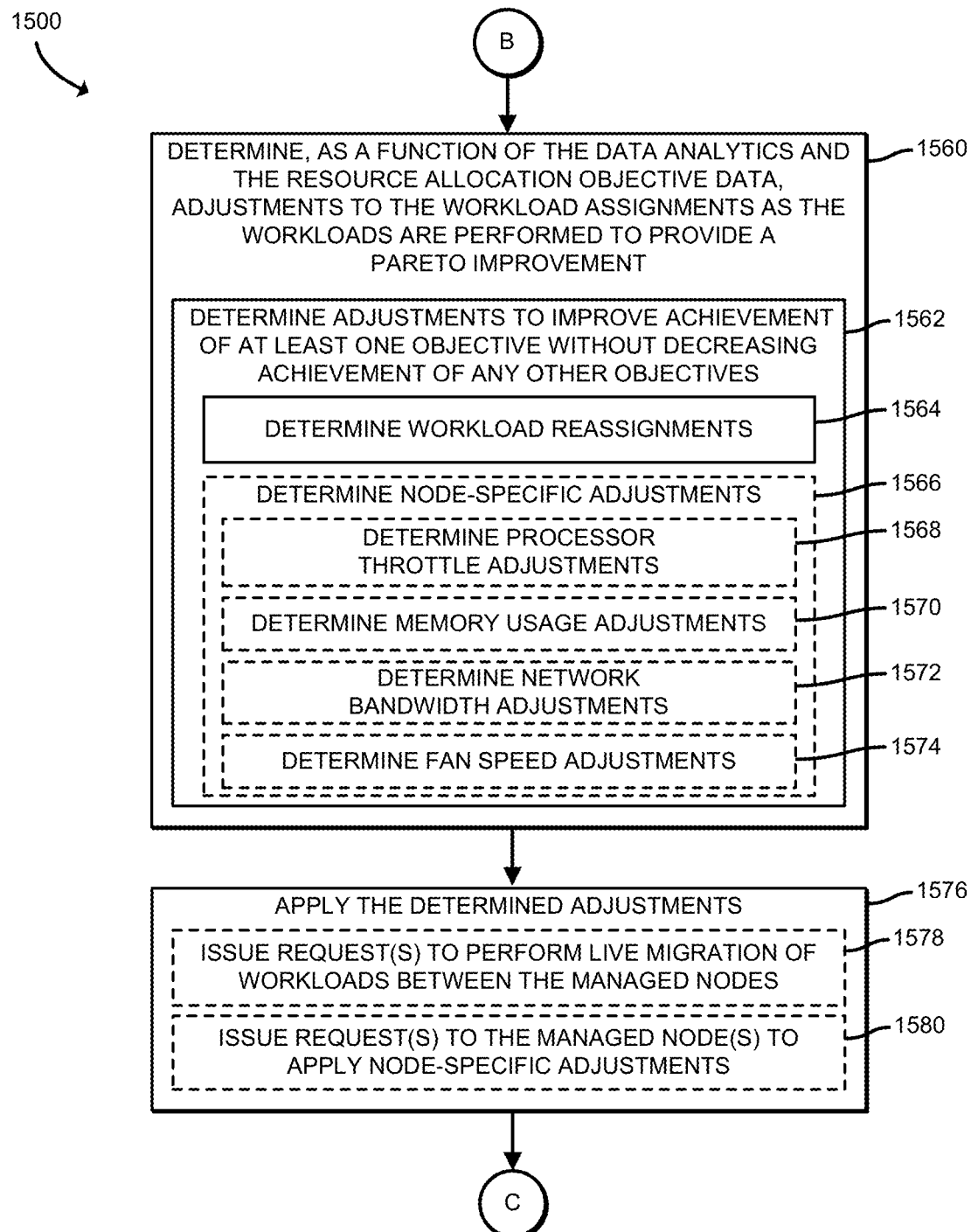

Referring now to FIG. 17, the illustrative orchestrator server 1240, in block 1560, determines, as a function of the data analytics and the resource allocation objective data 1404, adjustments to the workload assignments as the workloads are performed to provide a Pareto improvement. In doing so, the orchestrator server 1240 determines one or more adjustments to improve the achievement of at least one of the resource allocation objectives without decreasing the achievement of any of the other resource allocation objectives, as indicated in block 1562. As indicated in block 1564, the orchestrator server 1240 determines workload reassignments, to move at least one workload from one managed node 1260 to another managed node 1260. For example, as described above, one of the managed nodes 1260 may be presently experiencing contention, or may be predicted to experience contention, for a resource by two or more workloads presently executed by the managed node 1260. Accordingly, the orchestrator server 1240 may determine to move one or more of the workloads associated with the contention to another managed node that has or is predicted to have additional capacity of that particular resource.

The orchestrator server 1240 may additionally determine node-specific adjustments, as indicated in block 1566. The node-specific adjustments may be embodied as changes to settings within one or more of the managed nodes 1260, such as in the operating system, the drivers, and/or the firmware of components (e.g., the CPU 1302, the memory 1304, the communication circuitry 1308, the one or more data storage devices 1312, etc.) to improve resource utilization. As such, in the illustrative embodiment, in determining the node-specific adjustments, the orchestrator server 1240 may determine processor throttle adjustments, such as clock speed and/or processor affinity for one or more workloads, as indicated in block 1568. Additionally or alternatively, the orchestrator server 1240 may determine memory usage adjustments, such as allocations of volatile memory (e.g., the memory 1304) and/or data storage capacity (e.g., capacity of the one or more data storage devices 1312), memory bus speeds, and/or other memory-related settings, as indicated in block 1570. Additionally or alternatively, the orchestrator server 1240 may determine network bandwidth adjustments, such as an available bandwidth of the communication circuitry 1308 to be allocated to each workload in the managed node 1260, as indicated in block 1572. Additionally or alternatively, the orchestrator server 1240 may determine one or more fan speed adjustments to increase or decrease the cooling within the managed node 1260, as indicated in block 1574.

After determining the adjustments, the method advances to block 1576 in which the orchestrator server applies the determined adjustments. In doing so, the orchestrator server 1240 may issue one or more requests to perform a live migration of a workload between two managed nodes 1260 (i.e., a workload reassignment), as indicated in block 1578. In the illustrative embodiment, the migration is live because, rather than waiting until the workloads have been completed to analyze the telemetry data 1402, the orchestrator server 1240 collects and analyzes the telemetry data 1402, and makes adjustments online (i.e., as the workloads are being performed), as described above. Additionally or alternatively, as indicated in block 1580, the orchestrator server 1240 may issue one or more requests to one or more of the managed nodes 1260 to apply the node-specific adjustments described above with reference to block 1566. After applying the adjustments, the method 1500 loops back to block 1516 of FIG. 15, in which the orchestrator server 1240 receives additional telemetry data 1402 from the managed nodes 1260.

EXAMPLES

Illustrative examples of the technologies disclosed herein are provided below. An embodiment of the technologies may include any one or more, and any combination of, the examples described below.

Example 1 includes an orchestrator server to allocate resources of managed nodes to workloads to balance multiple resource allocation objectives, the orchestrator server comprising one or more processors; one or more memory devices having stored therein a plurality of instructions that, when executed by the one or more processors, cause the orchestrator server to receive resource allocation objective data indicative of multiple resource allocation objectives to be satisfied; determine an initial assignment of a set of workloads among the managed nodes; receive telemetry data from the managed nodes, wherein the telemetry data is indicative of resource utilization by each of the managed nodes as the workloads are performed; determine, as a function of the telemetry data and the resource allocation objective data, an adjustment to the assignment of the workloads to increase an achievement of at least one of the resource allocation objectives without decreasing an achievement of another of the resource allocation objectives; and apply the adjustments to the assignments of the workloads among the managed nodes as the workloads are performed.

Example 2 includes the subject matter of Example 1, and wherein the orchestrator server of Example 1, wherein the plurality of instructions, when executed, further cause the orchestrator server to generate, as a function of the telemetry data, data analytics of the telemetry data; and wherein to determine an adjustment to the assignment of the workloads comprises to determine the adjustment as a function of the data analytics.

Example 3 includes the subject matter of any of Examples 1 and 2, and wherein to generate the data analytics comprises to identify trends in resource utilization of the workloads.

Example 4 includes the subject matter of any of Examples 1-3, and wherein to generate the data analytics comprises to generate profiles of the workloads, wherein the profiles are indicative of an identity of each workload and a resource usage classification of each workload.

Example 5 includes the subject matter of any of Examples 1-4, and wherein to generate the data analytics comprises to predict future resource utilization of the workloads.

Example 6 includes the subject matter of any of Examples 1-5, and wherein to determine the adjustment to the assignment of the workloads comprises to determine a Pareto improvement to increase the achievement of at least one of the resource allocation objectives without decreasing the achievement of another of the resource allocation objectives.

Example 7 includes the subject matter of any of Examples 1-6, and wherein to receive resource allocation objective data comprises to receive two or more of power consumption objective data indicative of a target power usage of one or more of the managed nodes, performance objective data indicative of a target speed at which to perform the workloads, reliability objective data indicative of a target life cycle of one or more of the managed nodes, or thermal objective data indicative of a target temperature of one or more of the managed nodes.

Example 8 includes the subject matter of any of Examples 1-7, and wherein to receive telemetry data from the managed nodes comprises to receive at least one of power consumption data indicative of an amount of power consumed by each managed node, performance data indicative of a speed at which the workloads are executed by each managed node, temperature data indicative of a temperature within each managed node, processor utilization data indicative of an amount of processor usage consumed by each workload performed by each managed node, memory utilization data indicative of an amount or frequency of memory use by each workload performed by each managed node, or network utilization data indicative of an amount of network bandwidth used by each workload performed by each managed node.

Example 9 includes the subject matter of any of Examples 1-8, and wherein the plurality of instructions, when executed, further cause the orchestrator server to determine whether the assignment of the workloads is Pareto-efficient; and wherein to determine an adjustment to the assignment of the workloads comprises to determine, in response to a determination that the assignment of the workloads is not Pareto-efficient, an adjustment to the assignment of the workloads.

Example 10 includes the subject matter of any of Examples 1-9, and wherein to determine the adjustments comprises to determine one or more node-specific adjustments indicative of changes to an availability of one or more resources of at least one of the managed nodes to one or more of the workloads performed by the managed node.

Example 11 includes the subject matter of any of Examples 1-10, and wherein to determine the node-specific adjustments comprises to determine at least one of a processor throttle adjustment, a memory usage adjustment, a network bandwidth adjustment, or a fan speed adjustment.

Example 12 includes the subject matter of any of Examples 1-11, and wherein to apply the determined adjustments comprises to issue a request to perform a live migration of a workload between the managed nodes.

Example 13 includes the subject matter of any of Examples 1-12, and wherein to apply the determined adjustments comprises to issue a request to one of the managed nodes to apply one or more node-specific adjustments indicative of changes to an availability of one or more resources of the managed node to one or more of the workloads performed by the managed node.

Example 14 includes a method for allocating resources of managed nodes to workloads to balance multiple resource allocation objectives, the method comprising receiving, by an orchestrator server, resource allocation objective data indicative of multiple resource allocation objectives to be satisfied; determining, by the orchestrator server, an initial assignment of a set of workloads among the managed nodes; receiving, by the orchestrator server, telemetry data from the managed nodes, wherein the telemetry data is indicative of resource utilization by each of the managed nodes as the workloads are performed; determining, by the orchestrator server, as a function of the telemetry data and the resource allocation objective data, an adjustment to the assignment of the workloads to increase an achievement of at least one of the resource allocation objectives without decreasing an achievement of another of the resource allocation objectives; and applying, by the orchestrator server, the adjustments to the assignments of the workloads among the managed nodes as the workloads are performed.

Example 15 includes the subject matter of Example 14, and wherein the further including generating, by the orchestrator server and as a function of the telemetry data, data analytics of the telemetry data; and wherein determining an adjustment to the assignment of the workloads comprises determining the adjustment as a function of the data analytics.

Example 16 includes the subject matter of any of Examples 14 and 15, and wherein generating the data analytics comprises identifying trends in resource utilization of the workloads.

Example 17 includes the subject matter of any of Examples 14-16, and wherein generating the data analytics comprises generating profiles of the workloads, wherein the profiles are indicative of an identity of each workload and a resource usage classification of each workload.

Example 18 includes the subject matter of any of Examples 14-17, and wherein generating the data analytics comprises predicting future resource utilization of the workloads.

Example 19 includes the subject matter of any of Examples 14-18, and wherein determining the adjustment to the assignment of the workloads comprises determining a Pareto improvement to increase the achievement of at least one of the resource allocation objectives without decreasing the achievement of another of the resource allocation objectives.

Example 20 includes the subject matter of any of Examples 14-19, and wherein receiving resource allocation objective data comprises receiving two or more of power consumption objective data indicative of a target power usage of one or more of the managed nodes, performance objective data indicative of a target speed at which to perform the workloads, reliability objective data indicative of a target life cycle of one or more of the managed nodes, or thermal objective data indicative of a target temperature of one or more of the managed nodes.

Example 21 includes the subject matter of any of Examples 14-20, and wherein receiving telemetry data from the managed nodes comprises receiving at least one of power consumption data indicative of an amount of power consumed by each managed node, performance data indicative of a speed at which the workloads are executed by each managed node, temperature data indicative of a temperature within each managed node, processor utilization data indicative of an amount of processor usage consumed by each workload performed by each managed node, memory utilization data indicative of an amount or frequency of memory use by each workload performed by each managed node, or network utilization data indicative of an amount of network bandwidth used by each workload performed by each managed node.

Example 22 includes the subject matter of any of Examples 14-21, and further including determining, by the orchestrator server, whether the assignment of the workloads is Pareto-efficient; and wherein determining an adjustment to the assignment of the workloads comprises determining, in response to a determination that the assignment of the workloads is not Pareto-efficient, an adjustment to the assignment of the workloads.

Example 23 includes the subject matter of any of Examples 14-22, and wherein determining the adjustments comprises determining one or more node-specific adjustments indicative of changes to an availability of one or more resources of at least one of the managed nodes to one or more of the workloads performed by the managed node.

Example 24 includes the subject matter of any of Examples 14-23, and wherein determining the node-specific adjustments comprises determining at least one of a processor throttle adjustment, a memory usage adjustment, a network bandwidth adjustment, or a fan speed adjustment.

Example 25 includes the subject matter of any of Examples 14-24, and wherein applying the determined adjustments comprises issuing a request to perform a live migration of a workload between the managed nodes.

Example 26 includes the subject matter of any of Examples 14-25, and wherein applying the determined adjustments comprises issuing a request to one of the managed nodes to apply one or more node-specific adjustments indicative of changes to an availability of one or more resources of the managed node to one or more of the workloads performed by the managed node.

Example 27 includes one or more machine-readable storage media comprising a plurality of instructions stored thereon that in response to being executed, cause an orchestrator server to perform the method of any of Examples 14-26.

Example 28 includes an orchestrator server to allocate resources of managed nodes to workloads to balance multiple resource allocation objectives, the orchestrator server comprising one or more processors; one or more memory devices having stored therein a plurality of instructions that, when executed by the one or more processors, cause the orchestrator server to perform the method of any of Examples 14-26.

Example 29 includes an orchestrator server to allocate resources of managed nodes to workloads to balance multiple resource allocation objectives, the orchestrator server comprising resource manager circuitry to receive resource allocation objective data indicative of multiple resource allocation objectives to be satisfied and determine an initial assignment of a set of workloads among the managed nodes; telemetry monitor circuitry to receive telemetry data from the managed nodes, wherein the telemetry data is indicative of resource utilization by each of the managed nodes as the workloads are performed; wherein the resource manager circuitry is further to determine, as a function of the telemetry data and the resource allocation objective data, an adjustment to the assignment of the workloads to increase an achievement of at least one of the resource allocation objectives without decreasing an achievement of another of the resource allocation objectives and apply the adjustments to the assignments of the workloads among the managed nodes as the workloads are performed.

Example 30 includes the subject matter of Example 29, and wherein the resource manager circuitry is further to generate, as a function of the telemetry data, data analytics of the telemetry data; and wherein to determine an adjustment to the assignment of the workloads comprises to determine the adjustment as a function of the data analytics.

Example 31 includes the subject matter of any of Examples 29 and 30, and wherein to generate the data analytics comprises to identify trends in resource utilization of the workloads.

Example 32 includes the subject matter of any of Examples 29-31, and wherein to generate the data analytics comprises to generate profiles of the workloads, wherein the profiles are indicative of an identity of each workload and a resource usage classification of each workload.

Example 33 includes the subject matter of any of Examples 29-32, and wherein to generate the data analytics comprises to predict future resource utilization of the workloads.

Example 34 includes the subject matter of any of Examples 29-33, and wherein to determine the adjustment to the assignment of the workloads comprises to determine a Pareto improvement to increase the achievement of at least one of the resource allocation objectives without decreasing the achievement of another of the resource allocation objectives.

Example 35 includes the subject matter of any of Examples 29-34, and wherein to receive resource allocation objective data comprises to receive two or more of power consumption objective data indicative of a target power usage of one or more of the managed nodes, performance objective data indicative of a target speed at which to perform the workloads, reliability objective data indicative of a target life cycle of one or more of the managed nodes, or thermal objective data indicative of a target temperature of one or more of the managed nodes.

Example 36 includes the subject matter of any of Examples 29-35, and wherein to receive telemetry data from the managed nodes comprises to receive at least one of power consumption data indicative of an amount of power consumed by each managed node, performance data indicative of a speed at which the workloads are executed by each managed node, temperature data indicative of a temperature within each managed node, processor utilization data indicative of an amount of processor usage consumed by each workload performed by each managed node, memory utilization data indicative of an amount or frequency of memory use by each workload performed by each managed node, or network utilization data indicative of an amount of network bandwidth used by each workload performed by each managed node.

Example 37 includes the subject matter of any of Examples 29-36, and wherein the resource manager circuitry is further to determine whether the assignment of the workloads is Pareto-efficient; and wherein to determine an adjustment to the assignment of the workloads comprises to determine, in response to a determination that the assignment of the workloads is not Pareto-efficient, an adjustment to the assignment of the workloads.

Example 38 includes the subject matter of any of Examples 29-37, and wherein to determine the adjustments comprises to determine one or more node-specific adjustments indicative of changes to an availability of one or more resources of at least one of the managed nodes to one or more of the workloads performed by the managed node.

Example 39 includes the subject matter of any of Examples 29-38, and wherein to determine the node-specific adjustments comprises to determine at least one of a processor throttle adjustment, a memory usage adjustment, a network bandwidth adjustment, or a fan speed adjustment.

Example 40 includes the subject matter of any of Examples 29-39, and wherein to apply the determined adjustments comprises to issue a request to perform a live migration of a workload between the managed nodes.

Example 41 includes the subject matter of any of Examples 29-40, and wherein to apply the determined adjustments comprises to issue a request to one of the managed nodes to apply one or more node-specific adjustments indicative of changes to an availability of one or more resources of the managed node to one or more of the workloads performed by the managed node.

Example 42 includes an orchestrator server to allocate resources of managed nodes to workloads to balance multiple resource allocation objectives, the orchestrator server comprising circuitry for receiving resource allocation objective data indicative of multiple resource allocation objectives to be satisfied; circuitry for determining an initial assignment of a set of workloads among the managed nodes; means for receiving telemetry data from the managed nodes, wherein the telemetry data is indicative of resource utilization by each of the managed nodes as the workloads are performed; means for determining as a function of the telemetry data and the resource allocation objective data, an adjustment to the assignment of the workloads to increase an achievement of at least one of the resource allocation objectives without decreasing an achievement of another of the resource allocation objectives; and means for applying the adjustments to the assignments of the workloads among the managed nodes as the workloads are performed.

Example 43 includes the subject matter of Example 42, and wherein the further including means for generating, as a function of the telemetry data, data analytics of the telemetry data; and wherein the means for determining an adjustment to the assignment of the workloads comprises means for determining the adjustment as a function of the data analytics.

Example 44 includes the subject matter of any of Examples 42 and 43, and wherein the means for generating the data analytics comprises means for identifying trends in resource utilization of the workloads.

Example 45 includes the subject matter of any of Examples 42-44, and wherein the means for generating the data analytics comprises means for generating profiles of the workloads, wherein the profiles are indicative of an identity of each workload and a resource usage classification of each workload.

Example 46 includes the subject matter of any of Examples 42-45, and wherein the means for generating the data analytics comprises means for predicting future resource utilization of the workloads.

Example 47 includes the subject matter of any of Examples 42-46, and wherein the means for determining the adjustment to the assignment of the workloads comprises means for determining a Pareto improvement to increase the achievement of at least one of the resource allocation objectives without decreasing the achievement of another of the resource allocation objectives.

Example 48 includes the subject matter of any of Examples 42-47, and wherein the circuitry for receiving resource allocation objective data comprises circuitry for receiving two or more of power consumption objective data indicative of a target power usage of one or more of the managed nodes, performance objective data indicative of a target speed at which to perform the workloads, reliability objective data indicative of a target life cycle of one or more of the managed nodes, or thermal objective data indicative of a target temperature of one or more of the managed nodes.

Example 49 includes the subject matter of any of Examples 42-48, and wherein the circuitry for receiving telemetry data from the managed nodes comprises circuitry for receiving at least one of power consumption data indicative of an amount of power consumed by each managed node, performance data indicative of a speed at which the workloads are executed by each managed node, temperature data indicative of a temperature within each managed node, processor utilization data indicative of an amount of processor usage consumed by each workload performed by each managed node, memory utilization data indicative of an amount or frequency of memory use by each workload performed by each managed node, or network utilization data indicative of an amount of network bandwidth used by each workload performed by each managed node.

Example 50 includes the subject matter of any of Examples 42-49, and further including means for determining whether the assignment of the workloads is Pareto-efficient; and wherein the means for determining an adjustment to the assignment of the workloads comprises means for determining, in response to a determination that the assignment of the workloads is not Pareto-efficient, an adjustment to the assignment of the workloads.

Example 51 includes the subject matter of any of Examples 42-50, and wherein the means for determining the adjustments comprises means for determining one or more node-specific adjustments indicative of changes to an availability of one or more resources of at least one of the managed nodes to one or more of the workloads performed by the managed node.

Example 52 includes the subject matter of any of Examples 42-51, and wherein the means for determining the node-specific adjustments comprises means for determining at least one of a processor throttle adjustment, a memory usage adjustment, a network bandwidth adjustment, or a fan speed adjustment.

Example 53 includes the subject matter of any of Examples 42-52, and wherein the means for applying the determined adjustments comprises means for issuing a request to perform a live migration of a workload between the managed nodes.

Example 54 includes the subject matter of any of Examples 42-53, and the means for applying the determined adjustments comprises means for issuing a request to one of the managed nodes to apply one or more node-specific adjustments indicative of changes to an availability of one or more resources of the managed node to one or more of the workloads performed by the managed node.

The invention claimed is:

1. An orchestrator server to allocate resources of managed nodes to workloads to balance multiple resource allocation objectives, the orchestrator server comprising:
one or more processors;
one or more memory devices having stored therein a plurality of instructions that, when executed by the one or more processors, cause the orchestrator server to:
receive resource allocation objective data indicative of multiple resource allocation objectives to be satisfied;
determine an initial assignment of a set of workloads among the managed nodes, wherein each managed node is an assembly of disaggregated resources located on different sleds connected through a data center network to operate as local resources of the managed node;
receive telemetry data from the managed nodes, wherein the telemetry data is indicative of resource utilization by each of the managed nodes as the workloads are performed;
determine, as a function of the telemetry data and the resource allocation objective data, an adjustment to the assignment of the workloads to increase an achievement of at least one of the resource allocation objectives without decreasing an achievement of another of the resource allocation objectives; and
apply the adjustments to the assignments of the workloads among the managed nodes as the workloads are performed.

2. The orchestrator server of claim 1, wherein the plurality of instructions, when executed, further cause the orchestrator server to:
generate, as a function of the telemetry data, data analytics of the telemetry data; and
wherein to determine an adjustment to the assignment of the workloads comprises to determine the adjustment as a function of the data analytics.

3. The orchestrator server of claim 2, wherein to generate the data analytics comprises to identify trends in resource utilization of the workloads.

4. The orchestrator server of claim 2, wherein to generate the data analytics comprises to generate profiles of the workloads, wherein the profiles are indicative of an identity of each workload and a resource usage classification of each workload.

5. The orchestrator server of claim 2, wherein to generate the data analytics comprises to predict future resource utilization of the workloads.

6. The orchestrator server of claim 1, wherein to determine the adjustment to the assignment of the workloads comprises to determine a Pareto improvement to increase the achievement of at least one of the resource allocation objectives without decreasing the achievement of another of the resource allocation objectives.

7. The orchestrator server of claim 1, wherein to receive resource allocation objective data comprises to receive two or more of power consumption objective data indicative of a target power usage of one or more of the managed nodes, performance objective data indicative of a target speed at which to perform the workloads, reliability objective data indicative of a target life cycle of one or more of the managed nodes, or thermal objective data indicative of a target temperature of one or more of the managed nodes.

8. The orchestrator server of claim 1, wherein to receive telemetry data from the managed nodes comprises to receive at least one of power consumption data indicative of an amount of power consumed by each managed node, performance data indicative of a speed at which the workloads are executed by each managed node, temperature data indicative of a temperature within each managed node, processor utilization data indicative of an amount of processor usage consumed by each workload performed by each managed node, memory utilization data indicative of an amount or frequency of memory use by each workload performed by each managed node, or network utilization data indicative of an amount of network bandwidth used by each workload performed by each managed node.

9. The orchestrator server of claim 1, wherein the plurality of instructions, when executed, further cause the orchestrator server to determine whether the assignment of the workloads is Pareto-efficient; and
wherein to determine an adjustment to the assignment of the workloads comprises to determine, in response to a determination that the assignment of the workloads is not Pareto-efficient, an adjustment to the assignment of the workloads.

10. The orchestrator server of claim 1, wherein to determine the adjustments comprises to determine one or more node-specific adjustments indicative of changes to an availability of one or more resources of at least one of the managed nodes to one or more of the workloads performed by the managed node.

11. The orchestrator server of claim 10, wherein to determine the node-specific adjustments comprises to determine at least one of a processor throttle adjustment, a memory usage adjustment, a network bandwidth adjustment, or a fan speed adjustment.

12. The orchestrator server of claim 1, wherein to apply the determined adjustments comprises to issue a request to perform a live migration of a workload between the managed nodes.

13. One or more non-transitory machine-readable storage media comprising a plurality of instructions stored thereon that, in response to being executed, cause an orchestrator server to:
- receive resource allocation objective data indicative of multiple resource allocation objectives to be satisfied;
- determine an initial assignment of a set of workloads among a plurality of managed nodes, wherein each managed node is an assembly of disaggregated resources located on different sleds connected through a data center network to operate as local resources of the managed node;
- receive telemetry data from the managed nodes, wherein the telemetry data is indicative of resource utilization by each of the managed nodes as the workloads are performed;
- determine, as a function of the telemetry data and the resource allocation objective data, an adjustment to the assignment of the workloads to increase an achievement of at least one of the resource allocation objectives without decreasing an achievement of another of the resource allocation objectives; and
- apply the adjustments to the assignments of the workloads among the managed nodes as the workloads are performed.

14. The one or more non-transitory machine-readable storage media of claim 13, wherein the plurality of instructions, when executed, further cause the orchestrator server to:
- generate, as a function of the telemetry data, data analytics of the telemetry data; and
- wherein to determine an adjustment to the assignment of the workloads comprises to determine the adjustment as a function of the data analytics.

15. The one or more non-transitory machine-readable storage media of claim 14, wherein to generate the data analytics comprises to identify trends in resource utilization of the workloads.

16. The one or more non-transitory machine-readable storage media of claim 14, wherein to generate the data analytics comprises to generate profiles of the workloads, wherein the profiles are indicative of an identity of each workload and a resource usage classification of each workload.

17. The one or more non-transitory machine-readable storage media of claim 14, wherein to generate the data analytics comprises to predict future resource utilization of the workloads.

18. The one or more non-transitory machine-readable storage media of claim 13, wherein to determine the adjustment to the assignment of the workloads comprises to determine a Pareto improvement to increase the achievement of at least one of the resource allocation objectives without decreasing the achievement of another of the resource allocation objectives.

19. The one or more non-transitory machine-readable storage media of claim 13, wherein to receive resource allocation objective data comprises to receive two or more of power consumption objective data indicative of a target power usage of one or more of the managed nodes, performance objective data indicative of a target speed at which to perform the workloads, reliability objective data indicative of a target life cycle of one or more of the managed nodes, or thermal objective data indicative of a target temperature of one or more of the managed nodes.

20. The one or more non-transitory machine-readable storage media of claim 13, wherein to receive telemetry data from the managed nodes comprises to receive at least one of power consumption data indicative of an amount of power consumed by each managed node, performance data indicative of a speed at which the workloads are executed by each managed node, temperature data indicative of a temperature within each managed node, processor utilization data indicative of an amount of processor usage consumed by each workload performed by each managed node, memory utilization data indicative of an amount or frequency of memory use by each workload performed by each managed node, or network utilization data indicative of an amount of network bandwidth used by each workload performed by each managed node.

21. The one or more non-transitory machine-readable storage media of claim 13, wherein the plurality of instructions, when executed, further cause the orchestrator server to determine whether the assignment of the workloads is Pareto-efficient; and
- wherein to determine an adjustment to the assignment of the workloads comprises to determine, in response to a determination that the assignment of the workloads is not Pareto-efficient, an adjustment to the assignment of the workloads.

22. The one or more non-transitory machine-readable storage media of claim 13, wherein to determine the adjustments comprises to determine one or more node-specific adjustments indicative of changes to an availability of one or more resources of at least one of the managed nodes to one or more of the workloads performed by the managed node.

23. The one or more non-transitory machine-readable storage media of claim 22, wherein to determine the node-specific adjustments comprises to determine at least one of a processor throttle adjustment, a memory usage adjustment, a network bandwidth adjustment, or a fan speed adjustment.

24. The one or more non-transitory machine-readable storage media of claim 13, wherein to apply the determined adjustments comprises to issue a request to perform a live migration of a workload between the managed nodes.

25. An orchestrator server to allocate resources of managed nodes to workloads to balance multiple resource allocation objectives, the orchestrator server comprising:
- circuitry for receiving resource allocation objective data indicative of multiple resource allocation objectives to be satisfied;
- circuitry for determining an initial assignment of a set of workloads among the managed nodes, wherein each managed node is an assembly of disaggregated resources located on different sleds connected through a data center network to operate as local resources of the managed node;
- circuitry for receiving telemetry data from the managed nodes, wherein the telemetry data is indicative of resource utilization by each of the managed nodes as the workloads are performed;
- means for determining as a function of the telemetry data and the resource allocation objective data, an adjustment to the assignment of the workloads to increase an achievement of at least one of the resource allocation objectives without decreasing an achievement of another of the resource allocation objectives; and
- means for applying the adjustments to the assignments of the workloads among the managed nodes as the workloads are performed.

26. A method for allocating resources of managed nodes to workloads to balance multiple resource allocation objectives, the method comprising:

receiving, by an orchestrator server, resource allocation objective data indicative of multiple resource allocation objectives to be satisfied;

determining, by the orchestrator server, an initial assignment of a set of workloads among the managed nodes, wherein each managed node is an assembly of disaggregated resources located on different sleds connected through a data center network to operate as local resources of the managed node;

receiving, by the orchestrator server, telemetry data from the managed nodes, wherein the telemetry data is indicative of resource utilization by each of the managed nodes as the workloads are performed;

determining, by the orchestrator server, as a function of the telemetry data and the resource allocation objective data, an adjustment to the assignment of the workloads to increase an achievement of at least one of the resource allocation objectives without decreasing an achievement of another of the resource allocation objectives; and applying, by the orchestrator server, the adjustments to the assignments of the workloads among the managed nodes as the workloads are performed.

27. The method of claim 26, further comprising:

generating, by the orchestrator server and as a function of the telemetry data, data analytics of the telemetry data; and wherein determining an adjustment to the assignment of the workloads comprises determining the adjustment as a function of the data analytics.

28. The method of claim 27, wherein generating the data analytics comprises identifying trends in resource utilization of the workloads.

* * * * *